(12) United States Patent
Piramuthu

(10) Patent No.: US 8,682,029 B2
(45) Date of Patent: Mar. 25, 2014

(54) RULE-BASED SEGMENTATION FOR OBJECTS WITH FRONTAL VIEW IN COLOR IMAGES

(75) Inventor: Robinson Piramuthu, Oakland, CA (US)

(73) Assignee: Flashfoto, Inc., Los Gatos, CA (US)

( * ) Notice: Subject to any disclaimer, the term of this patent is extended or adjusted under 35 U.S.C. 154(b) by 542 days.

(21) Appl. No.: 12/735,093

(22) PCT Filed: Dec. 12, 2008

(86) PCT No.: PCT/US2008/013674
§ 371 (c)(1),
(2), (4) Date: Jun. 14, 2010

(87) PCT Pub. No.: WO2009/078957
PCT Pub. Date: Jun. 25, 2009

(65) Prior Publication Data
US 2010/0278426 A1    Nov. 4, 2010

Related U.S. Application Data

(60) Provisional application No. 61/013,984, filed on Dec. 14, 2007.

(51) Int. Cl.
*G06K 9/00* (2006.01)
(52) U.S. Cl.
USPC ........... 382/103; 382/118; 382/164; 382/154; 382/173; 382/287
(58) Field of Classification Search
USPC .......... 382/103, 118, 164, 154, 171, 173, 287
See application file for complete search history.

(56) References Cited

U.S. PATENT DOCUMENTS

| | | | |
|---|---|---|---|
| 5,757,380 A | 5/1998 | Bardon et al. |
| 5,832,055 A | 11/1998 | Dewaele |
| 5,881,171 A | 3/1999 | Kinjo |
| 5,930,391 A | 7/1999 | Kinjo |
| 6,021,221 A | 2/2000 | Takaha |
| 6,205,260 B1 | 3/2001 | Crinon et al. |
| 6,549,646 B1 | 4/2003 | Yeh et al. |
| 6,650,778 B1 | 11/2003 | Matsugu et al. |

(Continued)

FOREIGN PATENT DOCUMENTS

JP    2005339522 A    12/2005

OTHER PUBLICATIONS bin Abdul Rahman, KC Wei, RGB-H-CbCr Skin-Colour-Model-for-Human Face Detection, 2006.

(Continued)

*Primary Examiner* — Ali Bayat

(57) ABSTRACT

A method of labeling pixels in an image that represent human skin are detected and one or more regions in the image are identified. Each region may include all or a portion of a human face. Pixels that represent each face in the image are identified using the pixels that represent skin and the regions that include faces of the people, thereby identifying a position of each face in the image. A face mask and a torso map corresponding to each face is determined using determined face positions. The extracted face masks and the torso maps are used to refine a skin map. A person or people map is determined using the skin map and the rough body map.

20 Claims, 29 Drawing Sheets

(56) References Cited

U.S. PATENT DOCUMENTS

| | | |
|---|---|---|
| 6,697,502 B2 | 2/2004 | Luo |
| 6,757,442 B1 | 6/2004 | Avinash |
| 6,834,127 B1 * | 12/2004 | Yamamoto ............ 382/282 |
| 6,965,693 B1 | 11/2005 | Kondo et al. |
| 7,162,082 B2 | 1/2007 | Edwards et al. |
| 7,352,900 B2 | 4/2008 | Yamaguchi et al. |
| 7,391,906 B2 | 6/2008 | Blake et al. |
| 7,436,981 B2 | 10/2008 | Pace |
| 7,526,131 B2 | 4/2009 | Weber |
| 7,613,355 B2 | 11/2009 | Hirano |
| 7,676,081 B2 | 3/2010 | Blake et al. |
| 7,711,146 B2 * | 5/2010 | Tu et al. ............ 382/103 |
| 7,738,725 B2 | 6/2010 | Raskar et al. |
| 7,822,272 B2 | 10/2010 | Lei |
| 7,995,841 B2 | 8/2011 | Lin et al. |
| 8,041,081 B2 | 10/2011 | Hu |
| 8,094,928 B2 * | 1/2012 | Graepel et al. ......... 382/154 |
| 8,149,236 B2 * | 4/2012 | Nakao et al. .......... 345/423 |
| 8,165,407 B1 | 4/2012 | Khosla et al. |
| 8,194,974 B1 | 6/2012 | Skirko |
| 8,462,224 B2 * | 6/2013 | Zhang et al. .......... 348/222.1 |
| 2002/0071131 A1 | 6/2002 | Nishida |
| 2002/0076100 A1 * | 6/2002 | Luo ............ 382/164 |
| 2002/0154828 A1 | 10/2002 | Kobilansky et al. |
| 2002/0164074 A1 | 11/2002 | Matsugu et al. |
| 2003/0095701 A1 | 5/2003 | Shum et al. |
| 2003/0103682 A1 | 6/2003 | Blake et al. |
| 2003/0144585 A1 | 7/2003 | Kaufman et al. |
| 2004/0004626 A1 | 1/2004 | Ida et al. |
| 2004/0131236 A1 | 7/2004 | Chen et al. |
| 2004/0179233 A1 | 9/2004 | Vallomy |
| 2004/0212725 A1 | 10/2004 | Raskar |
| 2004/0264767 A1 | 12/2004 | Pettigrew |
| 2005/0008248 A1 | 1/2005 | Wang |
| 2005/0027896 A1 | 2/2005 | Mairs et al. |
| 2005/0196024 A1 | 9/2005 | Kuhnigk |
| 2005/0259280 A1 | 11/2005 | Rozzi |
| 2005/0271279 A1 * | 12/2005 | Fujimura et al. ......... 382/203 |
| 2006/0029275 A1 | 2/2006 | Li et al. |
| 2006/0233448 A1 | 10/2006 | Pace et al. |
| 2006/0245007 A1 * | 11/2006 | Izawa et al. .......... 358/448 |
| 2006/0251322 A1 | 11/2006 | Palum et al. |
| 2006/0269111 A1 | 11/2006 | Stoecker et al. |
| 2007/0013813 A1 | 1/2007 | Sun et al. |
| 2007/0247679 A1 | 10/2007 | Pettigrew et al. |
| 2007/0297645 A1 | 12/2007 | Pace |
| 2008/0089609 A1 | 4/2008 | Perlmutter et al. |
| 2008/0123945 A1 | 5/2008 | Andrew et al. |
| 2008/0137979 A1 | 6/2008 | Perlmutter et al. |
| 2008/0292194 A1 | 11/2008 | Schmidt et al. |
| 2009/0010539 A1 | 1/2009 | Guarnera et al. |
| 2009/0060297 A1 | 3/2009 | Penn et al. |
| 2009/0087089 A1 | 4/2009 | Hu |
| 2009/0129675 A1 | 5/2009 | Eggert et al. |
| 2009/0190815 A1 | 7/2009 | Dam et al. |
| 2009/0315910 A1 | 12/2009 | Kambhamettu et al. |
| 2010/0061628 A1 | 3/2010 | Yamada |
| 2010/0150423 A1 | 6/2010 | Hong et al. |
| 2010/0171740 A1 | 7/2010 | Andersen et al. |
| 2010/0232685 A1 | 9/2010 | Yokokawa et al. |
| 2010/0316288 A1 | 12/2010 | Ip et al. |
| 2011/0096228 A1 | 4/2011 | Deigmoeller et al. |

OTHER PUBLICATIONS

Brand J. et al., A Comparative Assessment of Three Approaches to Pixel-level skin-detection, 2000.

Koschan A. et al., Digital Color Image Processing, ISBN 978-0-470-14708-5, 2007.

Lipowezky et al: "Using integrated color and texture features for automatic hair detection", IEEE, 2008.

Boykov et al., Graph Cuts and Efficient N-D Image Segmentation, International Journal of Computer Vision 70(2), 109-131,2006.

Chuang et al., A Bayesian Approach to Digital Matting, Proc. of IEEE CVPR, pp. 264-271, 2001.

Foley, Computer Graphics: Principles and Practice, Addison-Wesley Professional, p. 13, ISBN 0201848406, 1995.

Yu et al., Object-Specific Figure-Ground Segmentation, 2003 IEEE Computer Society Conference on Computer Vision and Pattern Recognition, Proceedings, vol. 2, pp. 39-45.

Ioffe S., Probabilistic methods for finding people, International Journal of Computer Vision, vol. 43, issue 1, pp. 45-68, , 2001.

Vezhnevets V. et al., A Comparative Assessment of Pixel-Based Skin Detection Methods, Technical Report, Graphics and Media Laboratory, 2005.

Otsu N., A thresholding selection method from gray-level histogram, IEEE Transactions on System, Man and Cybernetics, vol. 1, pp. 62-66, 1979.

P. F. Felzenszwalb et al., Efficient matching of pictorial structures, Proceedings of the IEEE Conference on Computer Vision and Pattern Recognition, vol. 2, pp. 66-73., 2000.

Rodriguez M. D. et al., Detecting and segmenting humans in crowded scenes, Proceedings of the 15th International Conference on Multimedia, pp. 353-356, 2007.

Sharma V. et al., Simultaneous detection and segmentation of pedestrians using top-down and bottom-up processing, Proceedings of the IEEE Conference on Computer Vision and Pattern Recognition, pp. 1-8, Jun. 2007.

Srinivasan P. et al., Bottom up recognition and parsing of the human body, Proceedings of the IEEE Conference on Computer Vision and Pattern Recognition, pp. 1-8, Jun. 2007.

A. S. Micilotta et al., Detection and tracking of humans by probabilistic body part assembly, Proceedings of British Machine Vision Conference, vol. 1, pp. 429-438, Sep. 2005.

Green R. D. et al., Quantifying and recognizing human movement patterns from monocular video images—Part II: Applications to biometrics, IEEE Transactions on Circuits and Systems from Video Technology 14, issue 2, pp. 191-198, Feb. 2004.

Jacobs et al., Adaptive mixtures of local experts, Neural Computation 3, 79-87, 1991.

Leinhart R. et al., Empirical analysis of detection cascades of boosted classifiers for rapid object detection, MRL Technical Report , Intel Labs, May 2002.

\* cited by examiner

5(a)

5(b)

5(c)

5(d)

5(e)

7(a)

7(b)

7(c)

7(d)

7(e)

9(a)

9(b)

9(c)

9(d)

22(a)

22(b)

22(c)

22(d)

22(e)

22(f)

RULE-BASED SEGMENTATION FOR OBJECTS WITH FRONTAL VIEW IN COLOR IMAGES

CROSS REFERENCE TO RELATED APPLICATION

This application claims priority to U.S. provisional patent Application No. 61/013,984, filed Dec. 14, 2007, which is hereby incorporated by reference herein in its entirety.

BACKGROUND OF THE INVENTION

Though many people are currently trying to create methods for enabling a computer to accurately determine the foreground of an image, a method that would perform such a task has proven elusive. There have been a few that have come up with solutions (See e.g., Yu and Shi, "Object-Specific Figure-Ground Segmentation", 2003 IEEE Computer Society Conference on Computer Vision and Pattern Recognition, Proceedings, Volume 2, pages 39-45, which is hereby incorporated by reference herein in its entirety), but even those solutions aren't broad enough to solve the general problem of creating a system or method which would run effectively on any image. Even with the advancements of artificial intelligence, satisfactory solutions for having a computer automatically determine the "figure" and "ground," according to the definitions in psychology literature or as defined by Gestalt rules of perception, until now have not been discovered. The application of encoding human perception into machine readable code has proven to be a very difficult task.

One method for having a computer represent its results for determining the foreground of an image is to direct the computer to segment out the foreground from an image. With the advancement and cost effectiveness of digital photography, many more digital images are being created than ever before. Many of these newly created digital images are taken of a person or people, whereby the person or people are arguably in the foreground of the image. Person or people segmentation from an entire image is currently a popular research topic in the field of computer vision. Most of the segmentation approaches rely heavily on training sets and accuracy of probabilistic models. Such approaches have the drawback of being computational and memory intensive. They are also sensitive to model mismatch since they are based on heavy assumptions. Some examples of model based approaches are: (1) "Efficient matching of pictorial structures," P. F. Felzenszwalb, D. P. Huttenlocher, Proceedings of the IEEE Conference on Computer Vision and Pattern Recognition, vol. 2, pp. 66-73, 2000; (2) "Probabilistic methods for finding people," S. Ioffe, D. A. Forsyth, International Journal of Computer Vision, vol. 43, issue 1, pp. 45-68, 2001; (3) "Simultaneous detection and segmentation of pedestrians using top-down and bottom-up processing," V. Sharma, J. W. Davis, Proceedings of the IEEE Conference on Computer Vision and Pattern Recognition, pp. 1-8, June 2007; (4) "Bottom up recognition and parsing of the human body," P. Srinivasan, J. Shi, Proceedings of the IEEE Conference on Computer Vision and Pattern Recognition, pp. 1-8, June 2007; and (5) "Detecting and segmenting humans in crowded scenes," M. D. Rodriguez, M. Shah, Proceedings of the 15$^{th}$ International Conference on Multimedia, pp. 353-356, 2007.

Rule-based systems, such as decision trees, are more popular in detection and retrieval than segmentation applications. Rule-based systems use several thresholds (hard versus soft decisions) which may pose robustness issues. However, clever choices for parameters to threshold and when the parameter threshold (early or later in the decision tree) occurs can mitigate the robustness problems. Also, hierarchical rule-based systems are not as prone to the problems that can occur in high dimensional systems with model-based approaches. Rule-based systems are more forgiving to mismatch in assumptions than model-based systems. As should be apparent, there is a long-felt and unfulfilled need to provide improved techniques for rule-based segmentation for a person or people in color images.

BRIEF DESCRIPTION OF DRAWINGS

The accompanying drawings, which are included as part of the present specification, illustrate the presently preferred embodiments and together with the general description given above and the detailed description of the preferred embodiments given below serve to explain and teach the principles of the present invention.

DETAILED DESCRIPTION

Figure 1:
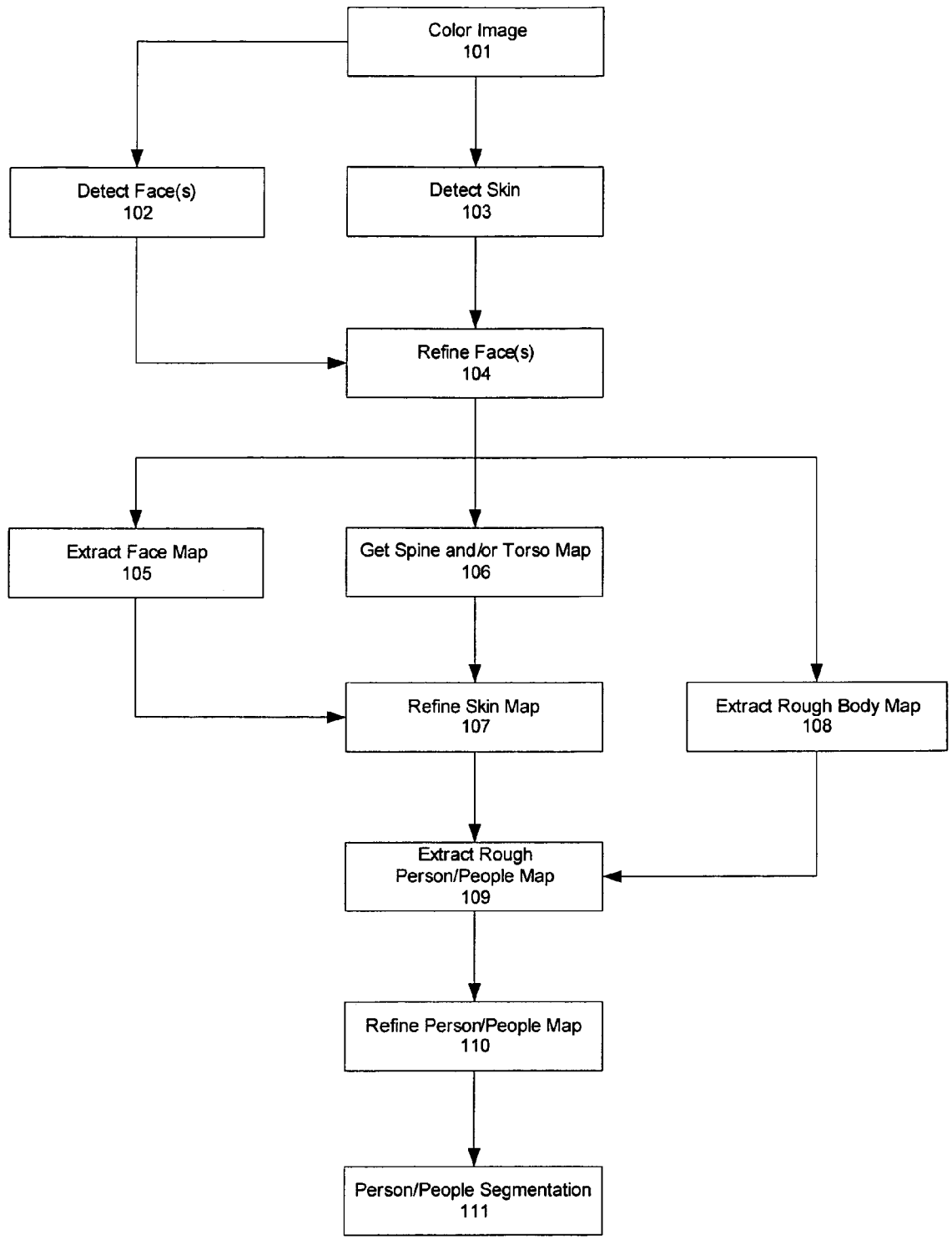
FIG. 1 is a diagrammatic illustration of a system, process or method for rule-based segmentation for objects such as a vertical person or people with full or partial frontal view in color images.

Systems and methods for unsupervised local boundary or region refinement of figure masks using over and under segmentation of regions are disclosed.

In the following description, for purposes of explanation, specific nomenclature is set forth to provide a thorough understanding of the various inventive concepts disclosed herein. However it will be apparent to one skilled in the art that these specific details are not required in order to practice the various inventive concepts disclosed herein.

Some portions of the detailed description that follow are presented in terms of processes and symbolic representations of operations on data bits within a computer memory. These process descriptions and representations are the means used by those skilled in the data processing arts to most effectively convey the substance of their work to others skilled in the art. A process is here, and generally, conceived to be a self-consistent sequence of sub-processes leading to a desired result. These sub-processes are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk, including floppy disks, optical disks, CD-ROMS, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the inventions as described herein.

FIG. 1 is a diagrammatic illustration of a system, process or method for rule-based segmentation for objects such as a vertical person or people with full or partial frontal view in color images, according to one embodiment of the present invention. All steps or tasks will be described using this one embodiment. However, it will be apparent to one of skill in the art, that the order of the steps described could change in certain areas, and that the embodiment is used for illustrative purposes and for the purpose of providing understanding of the inventive properties of the invention. A bottom-up approach is used during earlier stages and simple top-down cues are introduced as the stages progress. The systems and methods are designed to segment objects, such as a person or people, whose eyes are both visible in the image and are vertically orients.

Figure 27:
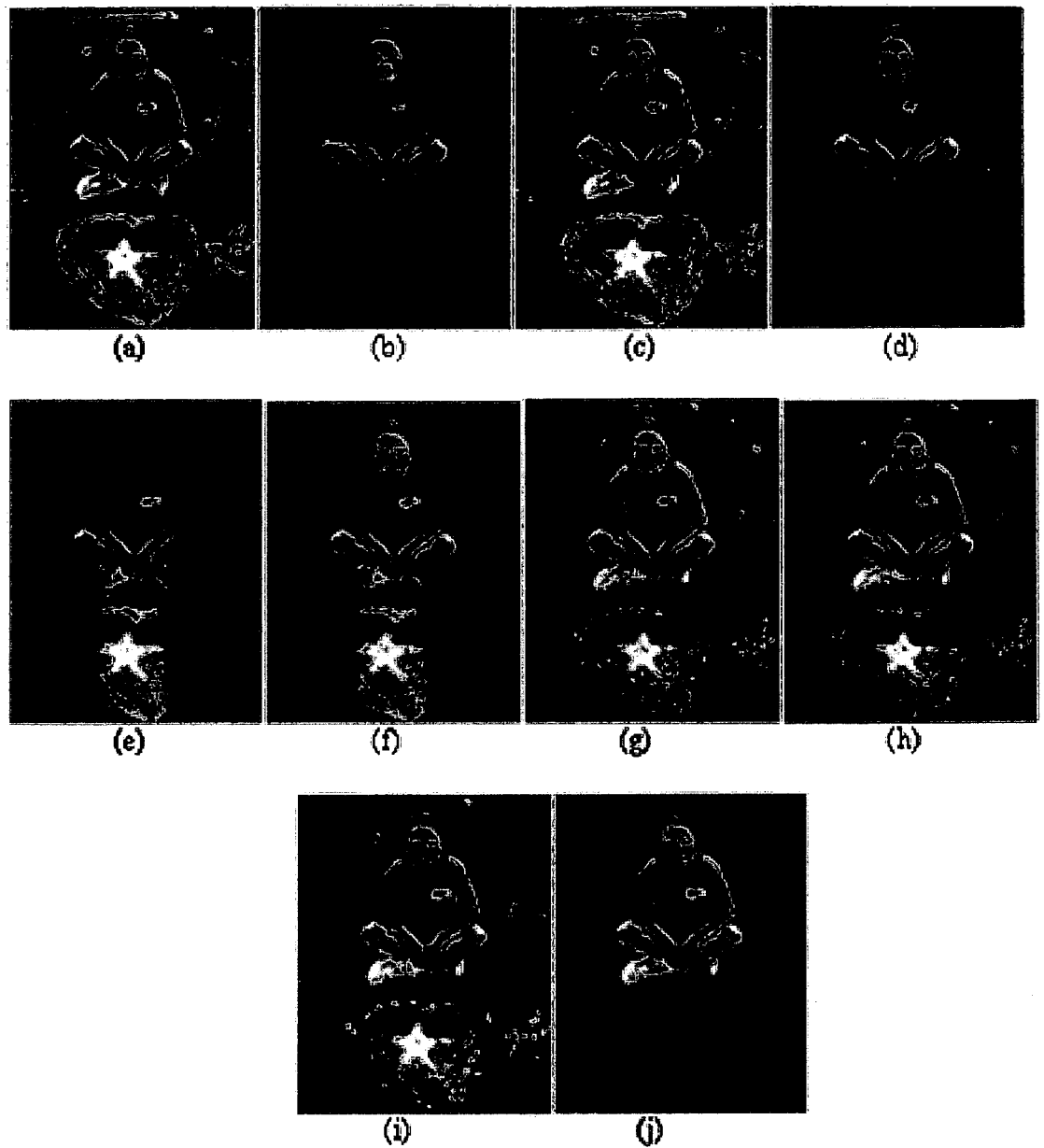
FIG. 27 and FIG. 28 illustrate rough people segmentation derived from maps, which are then refined using a projection step followed by refinements using color, size and distance of JigCut regions.
Figure 28:
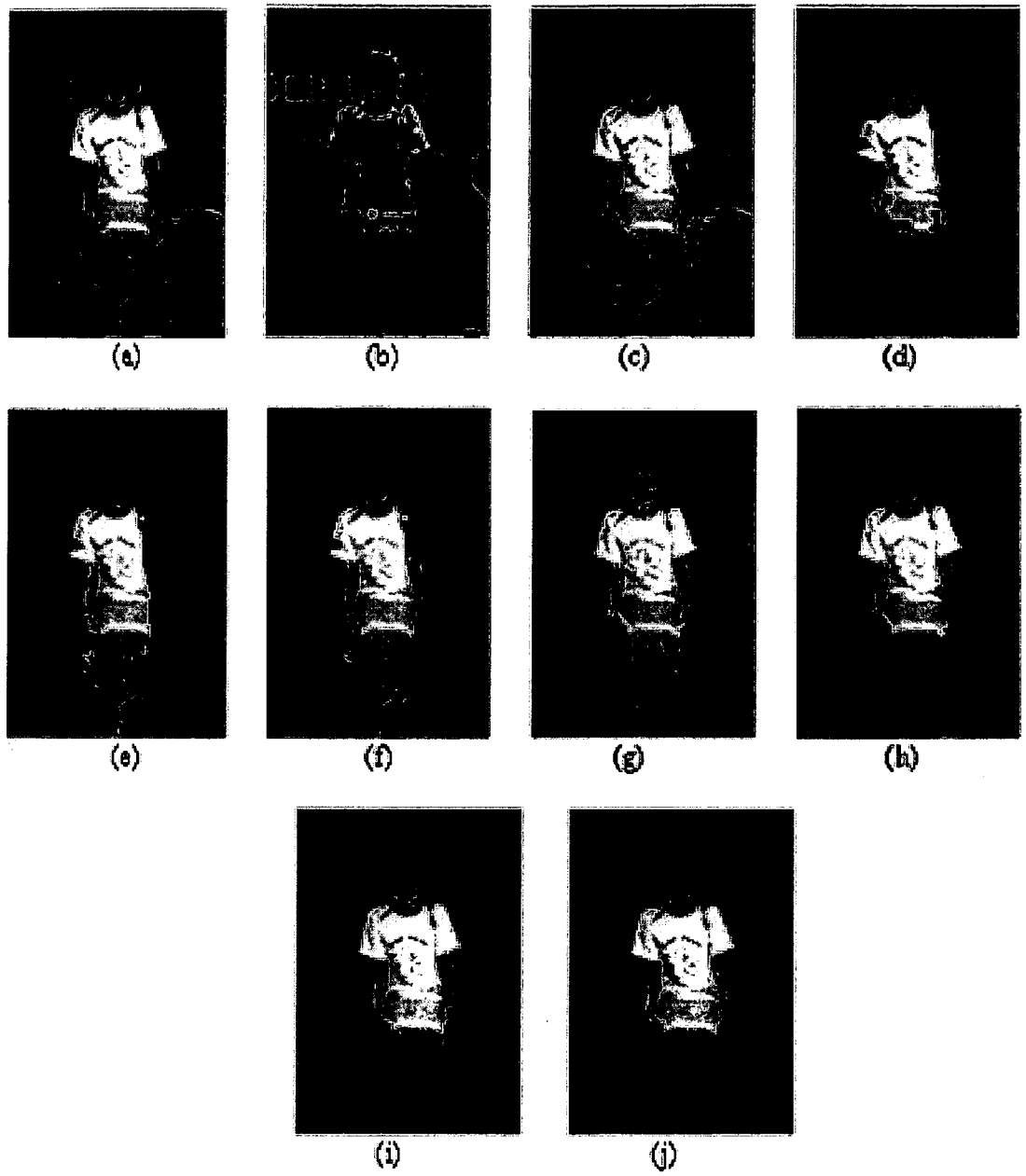

Generally, in the embodiment described in FIG. 1, faces are detected using a robust Haar-based classifier (see "Empirical analysis of detection cascades of boosted classifiers for rapid object detection", R. Lienhart, A. Kuranov, V. Pisarevsky, MRL Technical Report, Intel Labs, May 2002, which is hereby incorporated by reference herein) which operates only on the luminance channel. This face detector is a hierarchical rule-based system where the rules were created based on performance on a set of training images. However, it should be apparent to one of skill in the art that any face detector that would perform the desired functions could be used. Color information is used during skin detection. During this step, a model is created for detecting skin and non-skin pixels. Face, spine/torso, body maps are obtained using JigCut regions, face locations and weak templates. JigCut regions are defined in "System and Method for Moving Pixels of an Image from a First Layer to a Second Layer and an Improved Display of Tuned Multi-Scaled Regions of an Image," Provisional Patent Pending, Application No. 60/909,918, which is hereby incorporated by reference herein in its entirety. Rough people segmentation is derived from these maps, which is later refined using a projection step followed by refinements using color, size and distance of JigCut regions. Examples can be found in the following descriptions and two additional examples are given in FIG. 27 and FIG. 28.

As used herein, in some embodiments, an image is bit-mapped (e.g., a bitmap) or pixmapped (e.g., a pixmap). As used herein, a bitmap or pixmap is a type of memory organization or image file format or data structure used to store a digital image. A bitmap is a map of bits, a spatially mapped array of bits. Bitmaps and pixmaps refer to the similar concept of a spatially mapped array of pixels. Raster images in general may be referred to as bitmaps or pixmaps. In some embodiments, the term bitmap means one bit per pixel, while a pixmap means images with multiple bits per pixel. One example of a bitmap is a specific format used in WINDOWS® that is usually named with the file extension of .BMP (or .DIB for device-independent bitmaps). Besides BMP, other file formats that store literal bitmaps include InterLeaved Bitmap (ILBM), Portable Bitmap (PBM), X Bitmap (XBM), and Wireless Application Protocol Bitmap (WBMP). In addition to such uncompressed formats, as used herein, the term bitmap and pixmap refers to compressed formats. Examples of such bitmap formats include, but are not limited to, formats such as JPEG, TIFF, PNG, and GIF, to name just a few examples, in which the bitmap image, as opposed to the vector image, is stored in a compressed format. JPEG is usually lossy compression. TIFF is usually either uncompressed, or losslessly Lempel-Ziv-Welch compressed like GIF. PNG uses deflate lossless compression, another Lempel-Ziv variant. More disclosure on bitmap images is found in Foley, 1995, *Computer Graphics: Principles and Practice, Addison-Wesley Professional*, p. 13, ISBN 0201848406 as well as Pachghare, 2005, Comprehensive Computer Graphics: Including C++, Laxmi Publications, p. 93, ISBN 8170081858, each of which is hereby incorporated by reference herein in its entirety.

In typical uncompressed bitmaps, image pixels are generally stored with a color depth of 1, 4, 8, 16, 24, 32, 48, or 64 bits per pixel. Pixels of 8 bits and fewer can represent either grayscale or indexed color. An alpha channel, for transparency, may be stored in a separate bitmap, where it is similar to a greyscale bitmap, or in a fourth channel that, for example, converts 24-bit images to 32 bits per pixel. The bits representing the bitmap pixels may be packed or unpacked (spaced out to byte or word boundaries), depending on the format. Depending on the color depth, a pixel in the picture will occupy at least n/8 bytes, where n is the bit depth since 1 byte equals 8 bits. For an uncompressed, packed within rows, bitmap, such as is stored in Microsoft DIB or BMP file format, or in uncompressed TIFF format, the approximate size for a n-bit-per-pixel ($2^n$ colors) bitmap, in bytes, can be calculated as: size≈width×height×n/8, where height and width are given in pixels. In this formula, header size and color palette size, if any, are not included. Due to effects of row padding to align each row start to a storage unit boundary such as a word, additional bytes may be needed.

In some embodiments, an image is generated using a web browser for which source code is available, such as MOZILLA® FIREFOX®. An image of a web page can be an image of the rendered web page at a given instant in time or a time averaged representation of the web page over a period of time (e.g., one second or more, ten seconds or more, a minute or more, two minutes or more, etc.). In FIG. 1, a digital color image ("image") 101 is processed by detecting objects such as face or faces 102 and detecting skin 103. Detection of skin 103 is pixel-based. A report that compares various pixel-based approaches can be found in "A Comparative Assessment of Pixel-Based Skin Detection Methods", V. Vezhnevets, A. Andreeva, Technical Report, Graphics and Media Laboratory, 2005, which is hereby incorporated by reference herein in its entirety. This report compares non-parametric and parametric pixel-based approaches and contains several references. The most popular non-parametric approach is to generate color histograms for skin as well as non-skin pixels and then apply the classic Likelihood Ratio Test (LRT). One parametric approach is to model skin pixels by a single Gaussian or a mixture of Gaussians. This Gaussian can be modeled in two dimensional (hereinafter, "2-D") or three dimensional (hereinafter, "3-D") color space. As mentioned on page 12 of Vezhnevets and Andreeva, parametric methods typically only model skin and ignore non-skin pixels.

Two different approaches are contemplated. In one of these approaches, a parametric model is utilized for skin as well as non-skin pixels. Models were generated using a corpus for which skin-pixels were identified manually. Both skin detection approaches use a mixture of experts. The concept of mixture of experts is well known in other applications of object classification, pattern recognition and regression analysis. The general idea is to make final classification based on decisions by several independent experts See, for example, Jacobs, R. A., Jordan, M. I., Nowlan, S. J., & Hinton, G. E. (1991), "Adaptive mixtures of local experts," Neural Computation 3, 79-87, which is hereby incorporated by reference herein. A similar scheme is utilized for skin detection.

One approach that can be used is a geometric mean. This approach is used as the first pass for skin detection. A 2-D Gaussian model is generated for skin-pixels and another for non-skin pixels. The probability of skin and non-skin is evaluated for each pixel, based on the values of $C_b$ and $C_r$. The complement of non-skin probability is treated as another estimate for skin probability. These two estimates are the results from two experts. A threshold is applied to the geometric mean of these estimates to get a binary skin map. Model parameters and the decision rule are shown below:

$$\mu_{skin} = \begin{bmatrix} 0.4402 \\ 0.5863 \end{bmatrix},$$

$$\Sigma_{skin} = \begin{bmatrix} 0.9026e-3 & -0.7318e-3 \\ -0.7318e-3 & 1.1871e-3 \end{bmatrix}$$

$$\mu_{nonskin} = \begin{bmatrix} 0.4817 \\ 0.5220 \end{bmatrix},$$

$$\Sigma_{nonskin} = \begin{bmatrix} 2.2891e-3 & -14160e-3 \\ -1.4160e-3 & 3.0662e-3 \end{bmatrix}$$

$$f(\underline{x}; \underline{\mu}, \Sigma) = e^{-0.5(\underline{x}-\underline{\mu})^T \Sigma^{-1}(\underline{x}-\underline{\mu})}$$

$$SkinMap = 1, \text{ when } \sqrt{\frac{f(x_{C_bC_r}; \mu_{skin}, \Sigma_{skin}) *}{(1 - f(x_{C_bC_r}; \mu_{nonskin}, \Sigma_{nonskin}))}} > 0.16 \quad \text{Equation 1}$$

$$= 0, \text{ otherwise}$$

Another approach utilized is logical OR. This approach is used as a second pass for skin detection during the refinement of faces 104 (after gamma correction). It uses a mixture of experts to classify each pixel as skin or not. Each expert is a parametric model for skin in a particular color space. Non-skin model is not used. In some embodiments, there are three experts operating in the following 2-D color spaces: Tint-Saturation (from TSL), $C_b$-$C_r$ (from $YC_bC_r$) and a-b (from CIE-Lab). Model parameters are:

Expert 1

Tint-Saturation (from TSL Color Space)

$$\mu_{skin} = \begin{bmatrix} 0.5347 \\ 0.1637 \end{bmatrix}, \Sigma_{skin} = \begin{bmatrix} 1.2522e-3 & 0.2543e-3 \\ 0.2543e-3 & 7.3680e-3 \end{bmatrix},$$

$$\gamma_{skin} = 0.5$$

Expert 2

$C_b$-$C_r$ (from $YC_bC_r$ Color Space)

$$\mu_{skin} = \begin{bmatrix} 0.4402 \\ 0.5863 \end{bmatrix}, \Sigma_{skin} = \begin{bmatrix} 0.9026e-3 & -0.7318e-3 \\ -0.7318e-3 & 1.1871e-3 \end{bmatrix},$$

$$\gamma_{skin} = 0.4$$

Expert 3 a-b (from CIE-Lab Color Space with CIE Standard Illuminant D50)

$$\mu_{skin} = \begin{bmatrix} 16.9457 \\ 19.2031 \end{bmatrix}, \Sigma_{skin} = \begin{bmatrix} 60.2286 & 36.7229 \\ 36.7229 & 87.2707 \end{bmatrix},$$

$$\gamma_{skin} = 0.4$$

Each expert classifies skin pixels by applying a threshold to the skin probability as follows:

$$SkinMap_{expert} = 1, \text{ when } f(x; \mu_{skin}, \Sigma_{skin}) > \gamma_{skin}$$

$$= 0, \text{ otherwise}$$

A pixel is classified as a skin pixel if it is detected by any of the above experts.

$$SkinMap = SkinMap_{expert1} \lor SkinMap_{expert2} \lor SkinMap_{expert3} \quad \text{Equation 2}$$

Many approaches exist for face detection 102. See, for example, "Recent advances in face detection," M-H. Yang, a tutorial on "Advances in Face Processing: Detection" at the International Conference on Pattern Recognition, 2004, which is hereby incorporated by reference herein, for a survey. See also the Haar-based boosted classifier in "Rapid object detection using a boosted cascade of simple features," P. Viola, M. J. Jones, Proceedings of Computer Vision and Pattern recognition, vol. 1, pp. 511-518, 2001, which is hereby incorporated by reference herein. The classifier by Rainer Lienhart "Empirical analysis of detection cascades of boosted classifiers for rapid object detection," R. Lienhart, A. Kuranov, V. Pisarevsky, MRL Technical Report, Intel Labs, May 2002, which is hereby incorporated by reference herein, is available in OpenCV, an open source site for computer vision algorithms. It uses a cascaded boosted classifier as well. The input to this face detector is the luminance image. Color information is not used.

Figure 2:
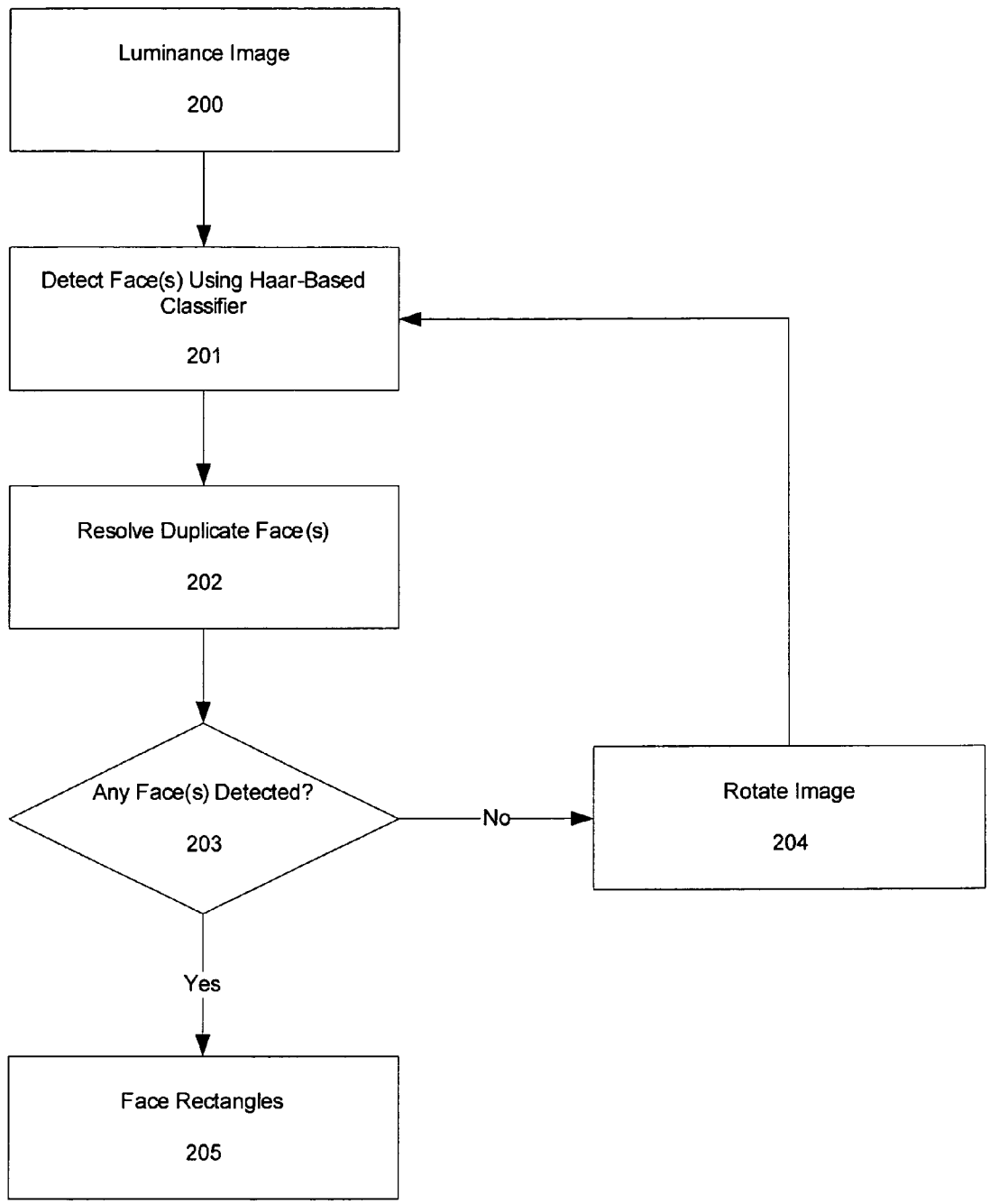
FIG. 2 is a diagrammatic illustration of an exemplary face detection scheme.

FIG. 2 is a diagrammatic illustration of an exemplary face detection scheme 102. A luminance image is input 200 to detect a face or faces using a Haar-based classifier 201. Haar-based face detectors will find multiple hits for the same face since they detect faces at multiple scales and translations. This is an advantageous aspect of an embodiment of the present invention for it allows for gaining confidence about the detected face. A detected face passes only when there are at least two hits. The following rules are used to consolidate multiple hits: (1) If the faces are close enough, then merge them; (2) If one face rectangle is completely inside the other, then they are merged as well. By this, the detection method resolves duplicate faces 202.

Face detection is geared towards finding faces that are not tilted. If face detection fails for 0 tilt 203, the image is rotated in increments (e.g., increments of 5 degrees), starting from, for example, 15 degrees until a face is detected 204. Both clockwise and counterclockwise rotations are used for a given angle. This conservative approach keeps false alarm low. Once complete, face rectangles 205 can be created for the image used for 200.

Figure 3:
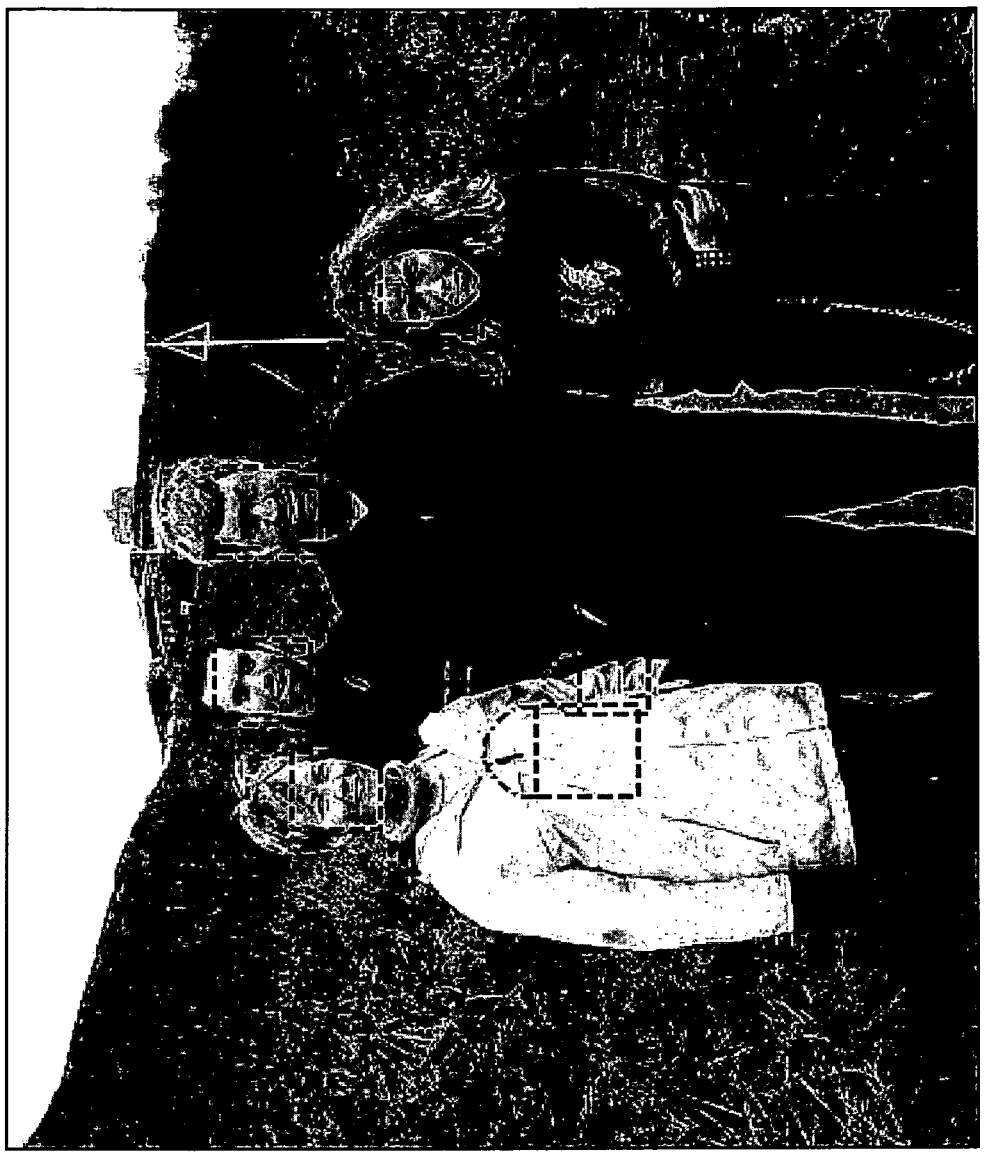
FIG. 3 provides an example of a possible result from the face detection scheme of FIG. 2.

FIG. 3 is provided as an example of a possible result from the face detection scheme 102. Faces are shown as rectangles with dashed lines. Notice that all faces are detected. However, there are two false alarms on the jacket of the women to the left of the image.

The face detector was tuned to have low miss rate at the cost of more false alarm. It returns a rectangle for each face it detects. Skin cue is used to reduce false alarm. Using skin cue for reducing false alarm is not unique. An example can be found in "Detection and tracking of humans by probabilistic body part assembly," A. S. Micilotta, E. J. Ong, R. Bowden, Proceedings of British Machine Vision Conference, vol. 1, pp. 429-438, September 2005, which is hereby incorporated by reference herein. The present invention uses skin cue differently from this example, where the authors (A. S. Micilotta, E. J. Ong, R. Bowden) look at the median color of face and use a Gaussian skin model for median color, to decide whether to keep or reject a face. Another popular approach to reduce false alarm is to use average face templates. The present invention does not use this approach since it would require several templates and it is computationally more expensive. Few other possibilities to reduce false alarm include extraction of eye map or mouth map or both to see if they are contained in face rectangles. Independent face detectors can be used and treated as a mixture of experts as well.

The present invention is geared towards computational efficiency and effectiveness, an advantageous aspect of the present invention. Skin map and simple first order variation of luminance regardless of spatial correspondence is utilized. Refinement of faces is achieved through stages.

Figure 4:
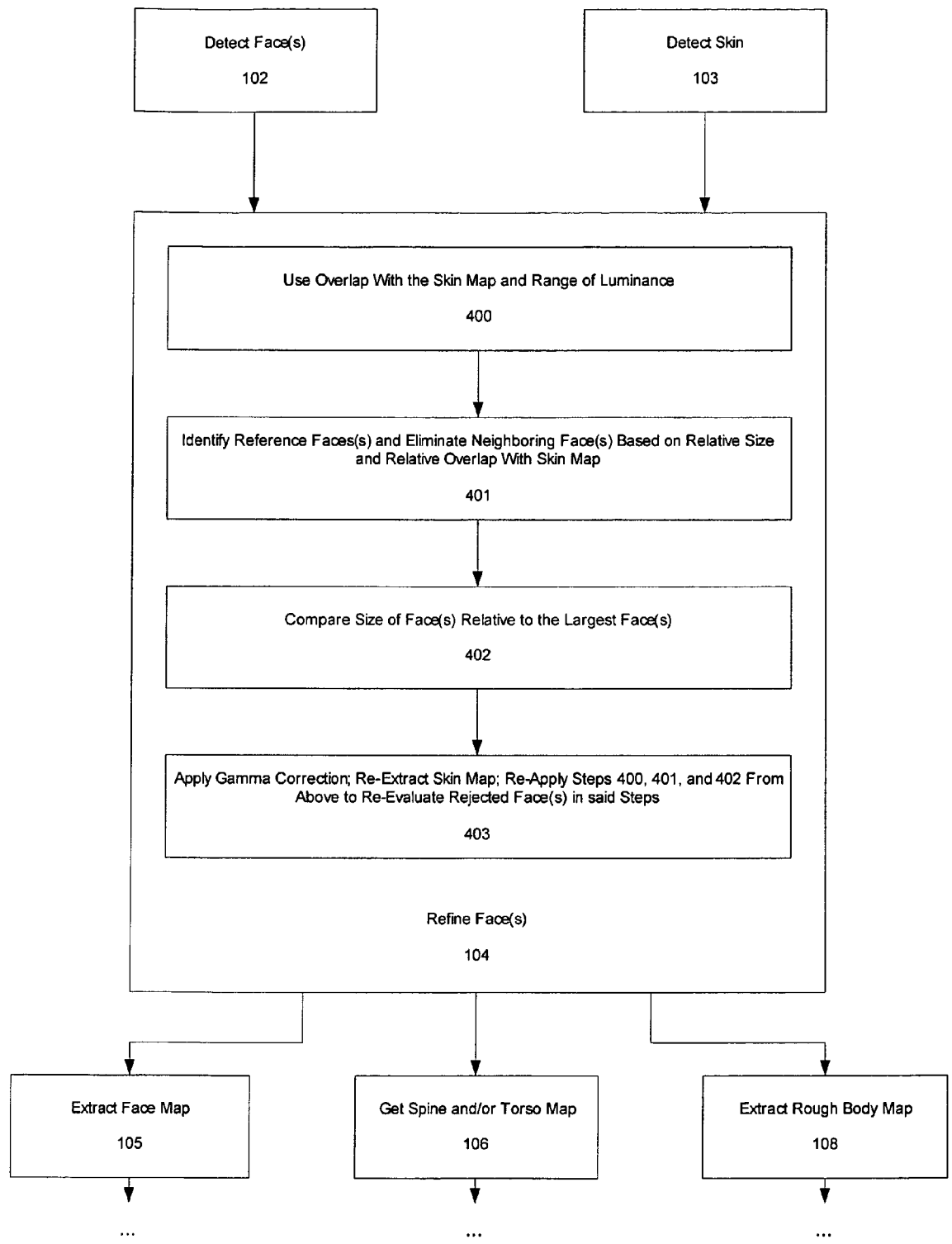
FIG. 4 is a diagrammatic illustration of an exemplary face refinement.

Once face detection 102 and skin detection are processed, the illustrative example in FIG. 1 would then refine the face or faces 104 location. FIG. 4 is a diagrammatic illustration of an exemplary face refinement 104. It provides for steps that are taken in one embodiment of face refinement. In use overlap with the skin map and range of luminance 400, the rules used in this step are based on the following premises: (1) Unlike limbs and torso, faces are normally exposed. Thus, we can expect to see several skin pixels in the face region; (2) the present invention utilizes person or people segmentation geared towards frontal view of humans. For instance, all human faces have eyes in the front that are more likely to look darker than the other neighboring regions due to depression and curvature that reduces the amount of light that reaches the camera. Even non-reflective sunglasses are likely to be dark regions. This means that the difference between maximum and minimum luminance inside the face rectangle should be appreciable when compared to the average luminance.

A face rectangle is considered to be a false alarm if both of the following conditions are satisfied: (1) Percentage of skin pixels $\leq \gamma$ %, and (2) Range of luminance $\leq 50\%$ of mean of luminance. In one embodiment $\gamma=4\%$, when there is only one detected face. In some embodiments, when there are multiple detected faces, the maximum overlap of a face rectangle with the skin map is determined and $\gamma$ is 60% of this maximum. Of course, other values for $\gamma$ can be used and all such values are within the scope of the present invention.

In the identify reference face(s) and eliminate neighboring face(s) routine based on relative size and relative overlap with skin map 401, the following premises are relied upon: (1) faces with high overlap with skin map are more likely to have well-behaved imaging conditions (incidence, diffusion and reflection); (2) neighboring faces are more likely to have similar lighting conditions than faces that are far apart; (3) neighboring faces with similar overlap with skin pixels are more likely to have matching skin properties; and (4) neighboring faces of similar size are more likely to be at the same distance plane from the camera lens. If there are clusters of faces, it is advantageous to find faces in the vicinity of the same distance plane.

The following steps are utilized in routine 401. First, faces that passed 400 and with more than a threshold amount of overlap (e.g., 50%) with skin map are selected as reference faces. These are treated as high confidence faces. Second, neighbors are currently defined to be faces rectangles within 1 face width of the reference face under consideration, in the horizontal direction. A reference face is selected and its neighbors are found. Third, if the skin overlap of the neighbor is less than a threshold amount (e.g., half) of the skin overlap of the reference face and they differ in their widths by more than a threshold amount (e.g. 10%), then reject that neighboring face. This process is repeated or performed contemporaneously for all other reference faces.

In the compare size of face(s) relative to the largest face step 402, face(s) that reaches this stage can still have a large range in size. If the range is too big, it is assumed there exists an error. Compare size of face(s) relative to the largest face routine 402 is utilized to identify or correct this error. The premise used is that the smallest face can be roughly up to a third of the size of the largest face. The maximum size of the passed faces is determined and any face that is less than a threshold amount of this size (e.g., 30%) is rejected.

In applying gamma correction; re-extract skin map; reapply steps 400, 401, and 402 from above to re-evaluate rejected faces in said steps (403), detection rate is improved by reducing the miss rate instead of reducing false alarm. The following steps are utilized: (1) preprocess original image using gamma correction; (2) redetect skin pixels from the transformed image; (3) reapply stages 400, 401, and 402 (FIG. 4) of face refinement using the new skin map; and (4) consolidate the detected faces before and after preprocessing.

In this embodiment, step 403 is only used if any of the rejected face(s) from steps 400, 401, or 402 overlap with any of the accepted faces. This provides for an advantageous aspect of the present invention, which is the reduction of false alarm that can be introduced after gamma correction.

It should be noted that steps 400 and 401 rely significantly on the skin map detected in step 103 from the original image. There is a possibility that the lighting conditions in the original image shifted the color of skin out of range of the skin models. This could be fixed by preprocessing the image before getting the skin map.

For the special case where the colors in an image are a bit washed out, it is observed that the blue content is increased. To compensate for this, the blue content of the image is reduced. This is equivalent to increasing yellow content of the image. Attenuating blue channel alone may have an unpleasant effect on colors in the image. To balance this, both red and green are emphasized by an equal amount. This is achieved by application of the standard gamma correction to red, green and blue channels with $\gamma_{red}=\gamma_{green}=0.9$ and $\gamma_{blue}=2$. Note that a color is emphasized when $\gamma<1$ and attenuated when $\gamma>1$.

Figure 6:
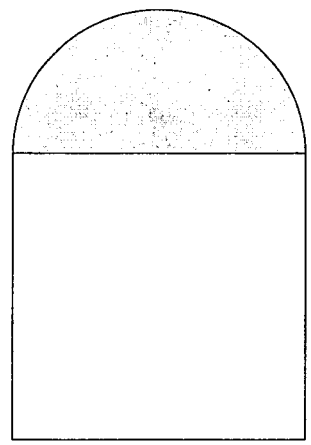
FIG. 6 is an illustrative example of a template for rough face map used by an extract face map method.

In the extract face map step 105, the present invention takes advantage of "JigCut clean up" approach proposed in U.S. Provisional Patent Application No. 61/007,359, entitled "Systems and Methods for Unsupervised Local Boundary or Region Refinement of Figure Mask Using Over and Under segmentation of Regions,", filed Dec. 11, 2007, which is hereby incorporated by reference herein in its entirety. This approach only requires a rough mask for which JigCut clean up is applied. A simple and reasonable mask for each face is the face rectangle with a semi-circular disc on top of it. This is illustrated in FIG. 6. FIG. 6. is an illustrative example of a template for a rough face map used by 105. A semicircular disc is placed on top face rectangle. The diameter of the disc equals the width of the rectangle. The semicircular disc is used to approximate the top of head so that pixels that represent a person's hair can be obtained as part of the segmentation as well. The width of face is used as the diameter of the disc in some embodiments. A more accurate, but cumbersome method is to look for boundary of head using parametric curves.

This above-described approach is repeated for each face rectangle and the union of these masks is treated as a rough binary mask for all faces in the image. JigCut cleanup is applied on the union of these masks. The final head segmentation is the union of JigCut regions that have at least a threshold (e.g., 50%) overlap with this mask. This approach gives a reasonable estimate of faces. Any discrepancy will be dealt with in the refine person/people map step 110. Note that the present invention is robust to different views of face (tilt, yaw, profile), but simple, elegant and effective. Using templates for parts of the face or the entire face is common in the literature. They are often cumbersome and require several templates and are not robust enough to different views of the face.

Figure 5:
FIG. 5 is provided as an illustrative example of an image processing till that shows transformation of colors by gamma correction improves skin detection, which in turn improves refinement of faces: $5(a)$ is a original image; $5(b)$ is the gamma corrected image; $5(c)$ is the original skin detection; $5(d)$ is the result of skin detection after gamma correction; and $5(e)$ is the final list of faces after refinement.
Figure 5:
Figure 5:
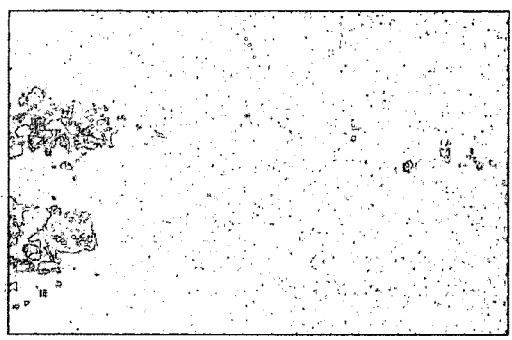
Figure 5:
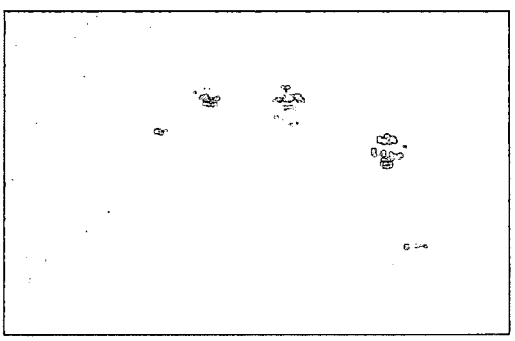
Figure 5:

FIG. 5 is provided as an illustrative example of an image processing till 104. This example shows transformation of colors by gamma correction improves skin detection, which, in turn, improves refinement of faces by the refine face(s) step 104. In FIG. 5, 5(*a*) is the original image and FIG. 5(*b*) is the gamma corrected image. Note that grey-scale patterns are more natural in 5(b) than in FIG. 5(a). This allows better detection of skin. FIG. 5(c) is the original skin detection from detect skin 103. FIG. 5(d) is the result of skin detection after gamma correction. FIG. 5(e) is the final list of faces after refinement 104. False alarms were rejected and all four faces are retained. In some embodiments, only the left most face is kept when the original skin map is used.

Figure 7:
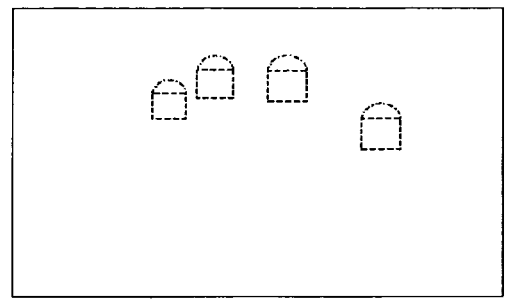
FIG. 7 is an illustrative example of an image processing till: $7(a)$ shows the face rectangle and semi-circular disc on the faces that were detected; $7(b)$ is a binary mask corresponding to $7(a)$; $7(c)$ provides the corresponding regions from $7(b)$; $7(d)$ provides the final binary face map after JigCut clean up; and $7(e)$ is the corresponding regions from $7(d)$.
Figure 7:
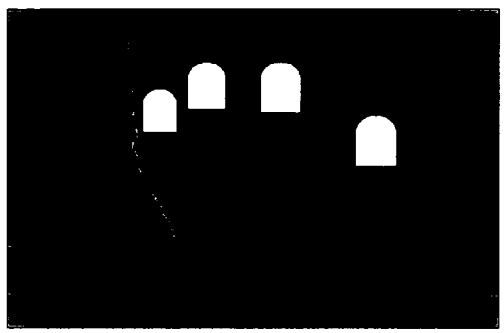
Figure 7:
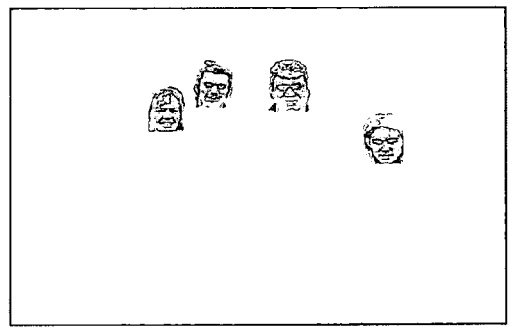
Figure 7:
Figure 7:
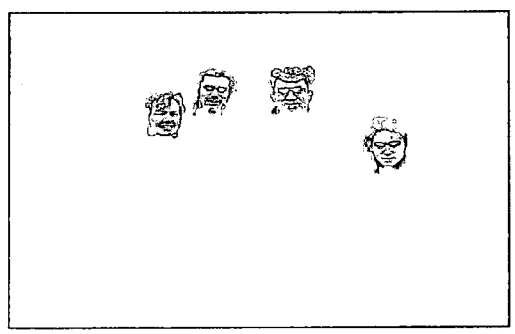

FIG. 7 provides an illustrative example of an image processing till 105. The different stages involved are illustrated. FIG. 7(a) shows the face rectangle and semi-circular disc on the faces that were detected. FIG. 7(b) is a binary mask corresponding to FIG. 7(a). FIG. 7(c) provides the corresponding regions from FIG. 7(b) in grey-scale. FIG. 7(d) provides the final binary face map after JigCut clean up. FIG. 7(e) is the corresponding regions from FIG. 7(d) in grey-scale.

Figure 8:
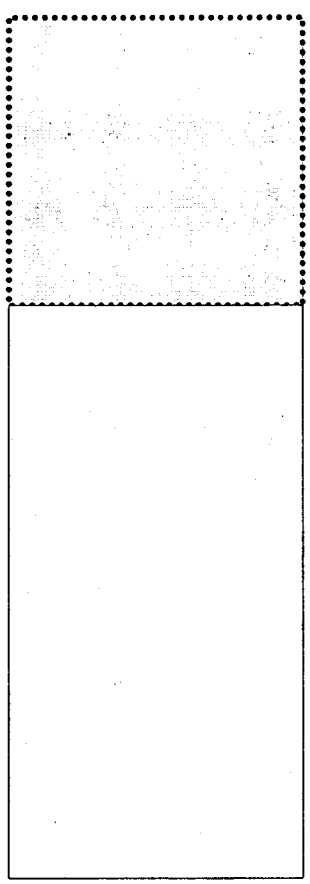
FIG. 8 is an illustrative example of a conservative template for the spinal area of torso used by a get spine and/or torso map procedure in accordance with an embodiment of the present invention.

Referring to FIG. 1, in get spine and/or torso map step 106, it is considered that human limbs have more complex configurations than rigid parts like head and torso. In some embodiments, it is assumed that people in the image are oriented vertically. This means that the torso must be immediately below the head, except for the possibility of a long neck. The size of shoulder relative to face depends on the stage of development of the human subject. For example, shoulders are narrower in a child than a fully grown adult, relative to the size of their face. In other words, the width of torso depends on the person. The same applies to the height of torso. However, spine and regions near spine are roughly similar. A reasonable estimate of this rigid region (spinal area of torso) across all people is a rectangle of same width as the width of face rectangle and height which is twice the height of face rectangle. An illustration is included in FIG. 8. FIG. 8 is an illustrative example of a conservative template for the spinal area of torso used by step 106. This is a rectangle immediately below the face rectangle. Width of the template is equal to the width of face rectangle, while the height equals twice that of the face rectangle. The face rectangle (shown in dotted lines) is not part of this template.

This is repeated for each face rectangle and the union of these masks is treated as a rough binary mask for all spinal torso regions in the image. The union of spinal regions is referred to as the template for spine/torso map or spine map.

JigCut cleanup is applied to the rough spine map. In some embodiments, the final segmentation of spinal torso region is the union of JigCut regions that have at least 5% overlap, at least 10% overlap, or at least 20% overlap with the spine map template. Any other JigCut region with lower, but positive overlap is included if it is spatially adjacent to a JigCut region in the initial spine map and also close enough to it in the RGB color space. A small threshold of 5%, 10%, 15%, or some value between 3% and 25% is used since the torso region is rigid and the template is an under-estimate of the torso. The use of a low threshold and a limited region grow using RGB color space helps in masking more of the torso than just the spinal region.

It is possible that the spinal map includes regions that are considered poor body configurations. To eliminate such regions, the following rules can be utilized: (1) If any of the JigCut regions from spine map touch the top edge of image frame, then eliminate them from the spine map; (2) JigCut regions from spine map that are too far (about 4.5 times the width of face) to the left or right of the face rectangle are eliminated; (3) Bigger JigCut regions from spine map that are almost horizontal and too far (about 4.5 times the width of face) to the left or right of the face rectangle are eliminated. JigCut regions are approximated by ellipses. If, for example, the minor axis of ellipse is greater than 75% of height of the largest face, than the JigCut region is considered big. In some embodiments, aspect ratio is used as a confidence for orientation and the threshold for orientation is 30° or some value within 10° of 30°.

Figure 9:
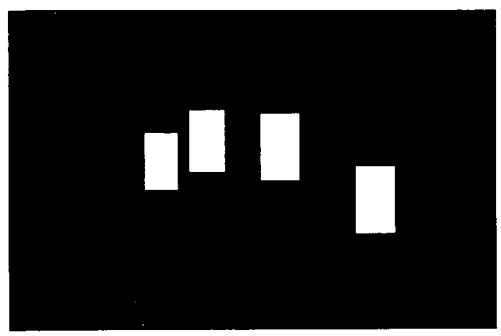
FIG. 9 is an illustrative example for the estimate of the creation of a spine/torso map based on the original image $5(a)$ in FIG. $5j$; $9(a)$ is the binary mask corresponding to the weak template for spinal regions of torso; $9(b)$ is the corresponding regions from $9(a)$; $9(c)$ is the final spine/torso map after JigCut clean up; and $9(d)$ is the corresponding regions from $9(c)$.
Figure 9:
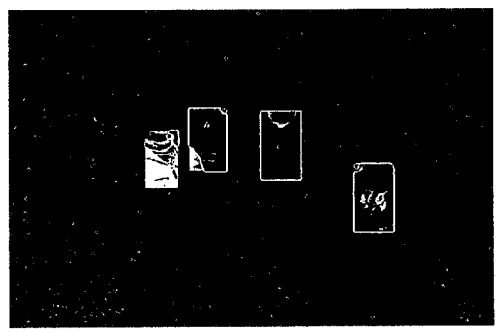
Figure 9:
Figure 9:

The above-identified approach gives a reasonable estimate of spine/torso map. FIG. 9 is provided as an illustrative example for the results from step 106 of FIG. 1. Based on the original image 5(a) in FIG. 5, FIG. 9(a) is the binary mask corresponding to the weak template for spinal regions of torso. FIG. 9(b) is the corresponding regions from 9(a) in grey-scale. FIG. 9(c) is the final spine/torso map after JigCut clean up. FIG. 9(d) is the corresponding regions from FIG. 9(c) in grey scale.

Note that the torso region is usually complex for a clothed person due to the complex design of clothing, changes in luminance/saturation of colors due to folds in clothing, occlusion due to arms or other objects. The present invention avoids the complex correlation based approach and is simple and elegant. This also addresses clothing that does not have uniform patterns throughout.

Then, referring to FIG. 1, at this stage in an embodiment in accordance with the present invention step 107 is performed. Step 107 is a skin map refinement. Pixel-based skin detection methods are prone to noise since they do not use high level cues from the current image. The skin detection in an embodiment of the present invention is pixel-based. Face detection is used to give a top-down cue to refine skin pixels.

Figure 10:
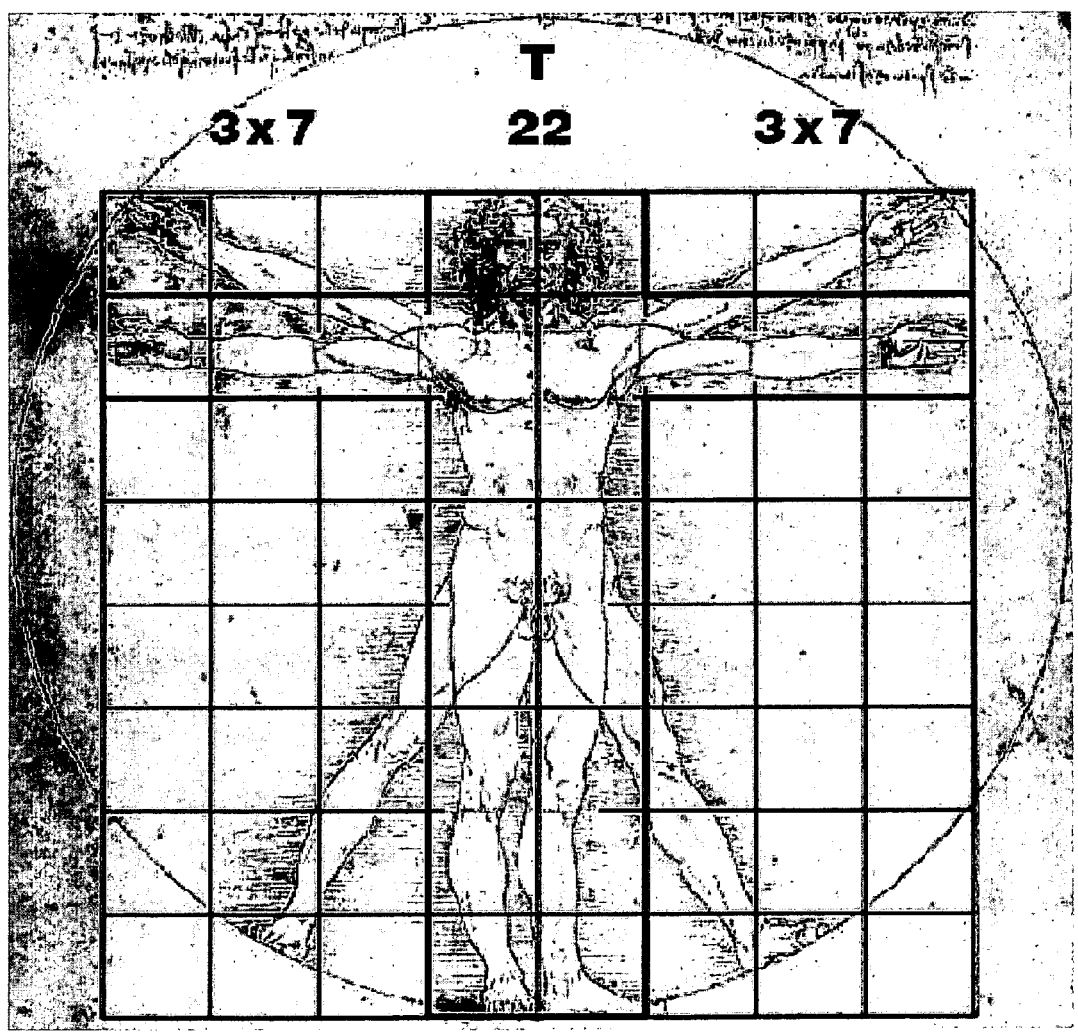
FIG. 10 illustrates proportions of body parts for the "perfect human" using Leonardo da Vinci's art work.

Proportions of body parts for the "perfect human" were suggested by several people. The model by Vitruvius ("De Architectura", Vitruvius, Book 3, c. 41), $1^{st}$ century BC) became popular due to Leonardo da Vinci's work as in FIG. 10. Vitruvius represented body parts proportional to the dimensions of the face. Other representative models can be found in "Quantifying and recognizing human movement patterns from monocular video images—Part II: Applications to biometrics,", R. D. Green, L. Guan, IEEE Transactions on Circuits and Systems from Video Technology 14, issue 2, pp. 191-198, February 2004, which is hereby incorporated by reference herein, where the authors use this idea to extract features for biometrics. The Vitruvian model was used by "Detection and tracking of humans by probabilistic body part assembly,", A. S. Micilotta, E. J. Ong, R. Bowden, Proceedings of British Machine Vision Conference 1, pp. 429-438, September 2005, which is hereby incorporated by reference herein, along with other cues for detection and tracking of humans in videos.

Figure 11:
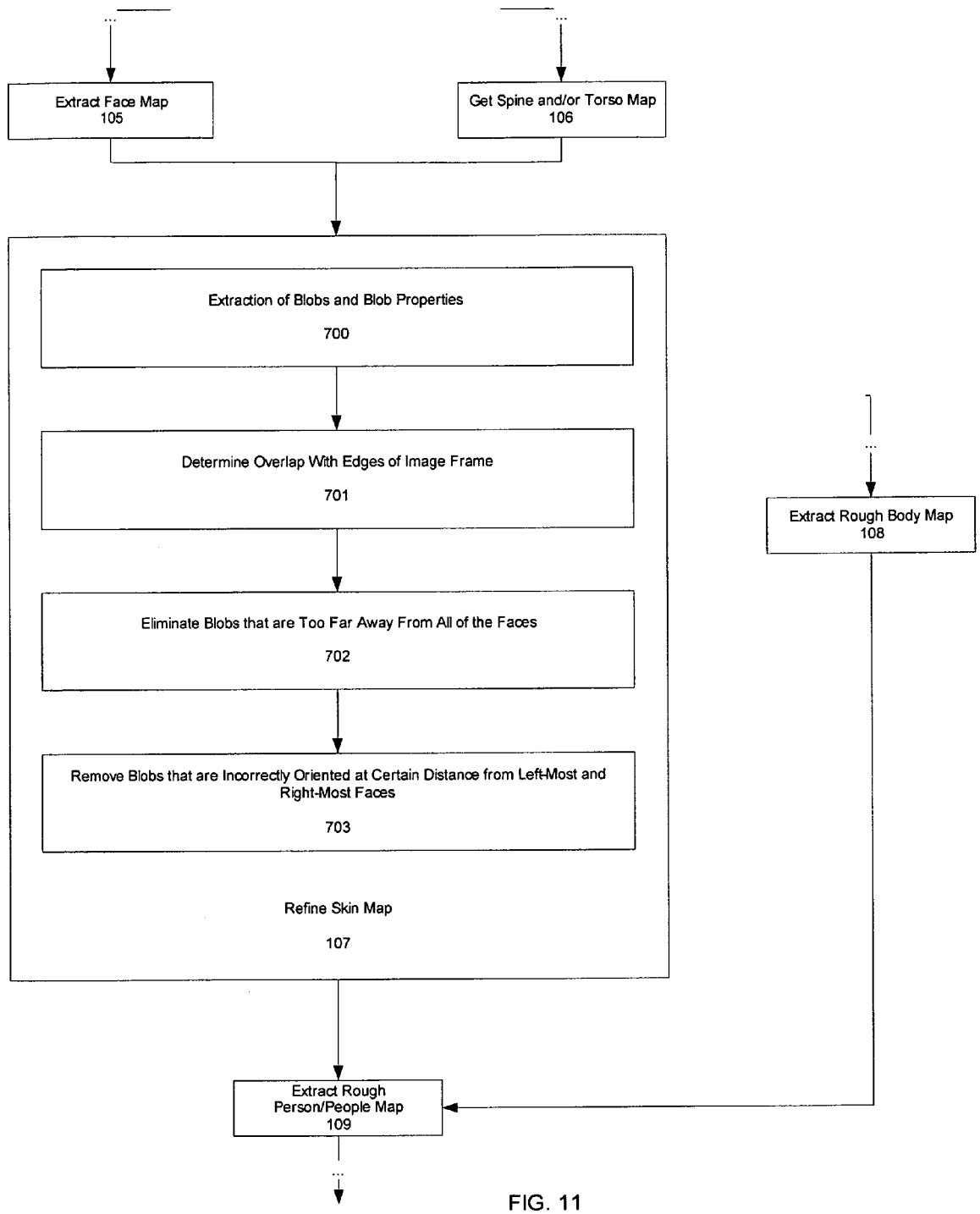
FIG. 11 is a diagrammatic illustration of a refine the skin map algorithm.

In step 107, skin pixels are first refined using JigCut cleanup. The refined mask is the union of JigCut regions that have at least, for example, 50% overlap with the initial skin mask. In various alternative embodiments, the requirement of at least 30%, at least 40%, at least 60%, or at least 70% overlap with the initial skin mask is used. A set of rules based on a model similar to the Vitruvian-Man is then used to remove noisy skin blobs. This is achieved through several stages, grouped based on type of rules, as summarized in FIG. 11. FIG. 11 is a diagrammatic illustration of step 107 of FIG. 1. A skin blob that satisfies any of the rules is eliminated. The only exception is when a skin blob overlaps with the union of face and spine/torso maps by more than 50%.

Generally speaking, the following convention is observed for the rules used for step 107, unless specified otherwise: (1) a blob is considered large when its area is >2*largest area of all faces; (2) a blob is considered far if it greater than half the maximum dimension of all faces; (3) the uncertainty in orientation is +/−10° and aspect ratio is used to measure confidence of orientation.

In step 700 of FIG. 11, connected component analysis is applied to the skin map after JigCut clean up with an overlap threshold. In preferred embodiments the overlap threshold is 50%. In various alternative embodiments the overlap threshold is set to a single value anywhere in the range between 25% and 75%. In various other embodiments, the overlap threshold is set to a single value anywhere in the range between 40% and 70%. Area and rectangular bounding box of each blob is determined. The best-fit ellipse is determined for each blob. The minor axis, major axis and orientation of each ellipse are recorded. The rules are applied based on these properties.

In step 701 of FIG. 11, the premise that most of the consumer images do not have people touching either the left, top or right edges of image frame is utilized. This observation is used to eliminate skin blobs that touch any of these edges by a certain amount. The exact rules are as follows. In some embodiments, a skin blob that satisfies any of the following rules is eliminated:

(1) contact with top edge as well as one of the side edges of image frame;

(2) overlap with top edge of image frame>a threshold percentage of width of image (e.g. 30%, or some single value chosen from the range of between 5% and 70% of width of image);

(3) overlap with left edge of image frame>(height of image−a threshold of height of the left-most face) (e.g., 150%, or some single value chosen from the range of between 125% and 175% of height of the left-most face); and/or (4) overlap with right edge of image frame>(height of image−a threshold of height of the right-most face) (e.g., 150%, or some single value chosen from the range of between 125% and 175% of height of the right-most face).

Figure 12:
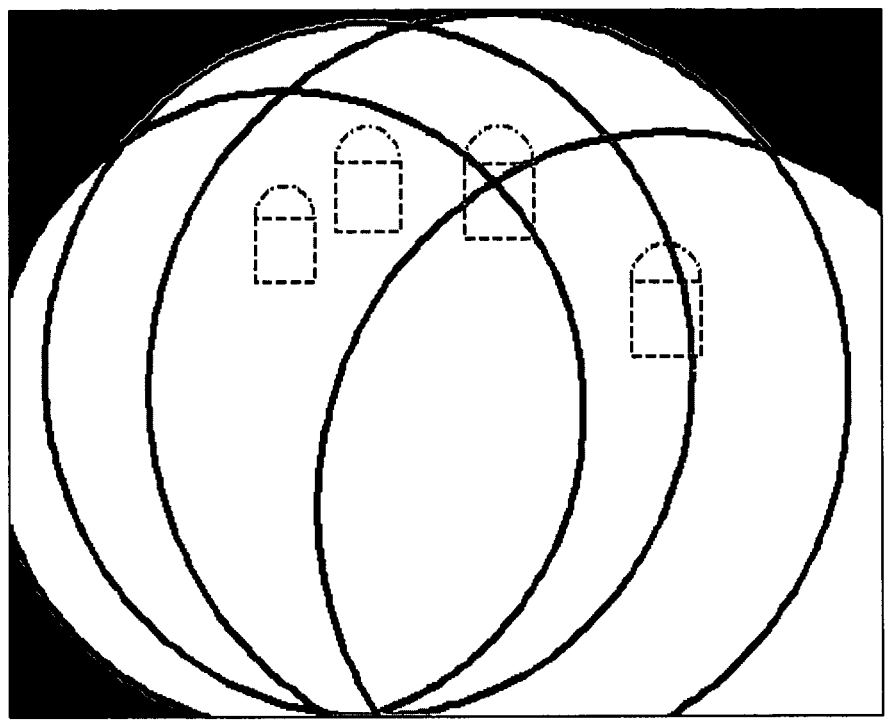
FIG. 12 displays the union of "Vitruvian" discs.

In step 702 of FIG. 11, an attempt is made to retrieve skin regions that correspond to people nearby only when their face is detected. A skin blob that satisfies any of the following six rules is eliminated:

(1) A mask is created using the union of "Vitruvian disc" for each face as shown in FIG. 12. These discs are identical to the model in FIG. 10. FIG. 12 displays the union of "Vitruvian" discs. Four faces were detected in the original image and are shown using rectangles. Color of face rectangles and Vitruvian discs match and are shown for pedagogic reasons. The mask itself is binary. In some embodiments, if the overlap of skin blob with this disc is ≤50% and either the area is greater than half the area of face or the minor axis is greater than half the maximum height of all faces, then that blob is removed. In various alternative embodiments, if the overlap of skin blob with this disc is ≤30%, ≤35%, ≤45%, ≤55%, or ≤60% and either the area is greater than a first threshold of the area of face or the minor axis is greater than a second threshold of the maximum height of all faces, than that blob is removed. In these various alternative embodiments, the first threshold is a single value chosen from the range of 0.25 to 0.75 and the second threshold is a single value chosen from the range of 0.25 to 0.75.

(2) Large and too far above all other candidate faces (top row of blob starts more than maximum face height from the top-most face).

(3) Too far (e.g., about eight times maximum height of faces) below all other candidate faces (in various other embodiments a criterion of 9 times maximum height of faces, 10 times maximum height of faces, 11 times maximum height of faces, or a single value in the range of between 5 and 15 times maximum height of faces, is used for this selection rule.

(4) Too far to the left of all other candidate faces (e.g., starts at >4.5*width of left-most face). For large blobs, a lower threshold (e.g., 1.5 instead of 4.5) is used.

(5) Too far to the right of all other faces (e.g., right side of blob is >4.5*width of right-most face). For large blobs, a lower threshold (1.5 instead of 4.5) is used.

(6) Thin blobs (e.g., minor axis <half the maximum face height, major axis >4*minor axis) are removed if they are too far above all faces.

In step 703 of FIG. 11, the premise that is used to remove blobs is that limbs are thin and the torso is much bigger. Also, human limbs are connected to axes of rotation and hence their orientations are limited depending on their extension. Thus, the following rules are used in step 703 to remove blobs in some embodiments:

(1) horizontal blob too far away below the abdomen (e.g., >2.5*face height from the bottom-most face);

(2) horizontal blob too far (more than maximum face width away) above all faces;

(3) vertical blob too far away the left (left column>width of left-most face); and (4) vertical blob too far away the right (right column>width of right-most face).

In some embodiments, if any one of these four rules is not satisfied, the blob is removed.

Figure 14:
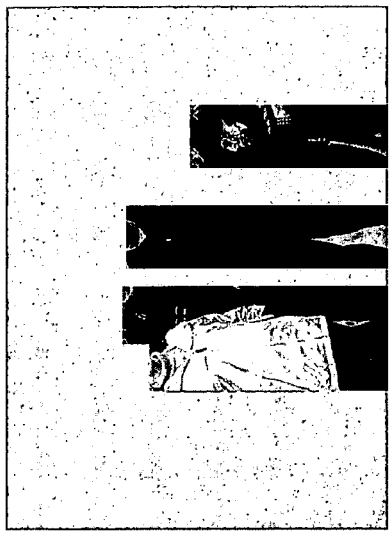
FIG. 14 illustrates the various steps of an extract rough body map algorithm using the sample image $5(a)$: $14(a)$ represents the binary mask corresponding to the weak template for body map; $14(b)$ displays the corresponding regions from 14(*a*) in color; 14(*c*) displays the final body map after JigCut clean up as a binary mask; and 14(*d*) displays the corresponding regions in color.
Figure 14:
Figure 14:
Figure 14:

Referring to FIG. 1, in some embodiments, the method further optionally includes step 108 in which a rough body map is extracted. In step 108, a rectangular mask is created below each face e.g. with 1.5 times the width and 9 times the height of the corresponding face. In alternative embodiments, the rectangular mask is created below each face e.g. with a single value in the range between 0.7 and 2 times the width and a single value between 6 and 12 times the height of the corresponding face. JigCut cleanup is applied to the union of these rectangles. In typical embodiments, the final body mask is the union of JigCut regions that have at least 50% overlap with this rough mask. In other embodiments, the final body mask is the union of JigCut regions that have at least 30%, at least 40%, or at least 60% overlap with this rough mask. The conservative estimate of 1.5 times the width was chosen since kids have this size relative to their face. In some embodiments, the height was chosen to be 9 times the height of face as an over-estimate since the background behind/near the lower body is normally less complex than background behind/near the upper body and hence easier to be removed using JigCut cleanup. Any other extraneous regions will likely be cleaned up by the last module, which refines the people mask. FIG. 14 illustrates the various steps using the sample image 5(*a*). FIG. 14(*a*) represents the binary mask corresponding to the weak template for body map. 14(*b*) displays the corresponding regions from 14(*a*) in grey-scale. FIG. 14(*c*) displays the final body map after JigCut clean up as a binary mask and FIG. 14(*d*) displays the corresponding regions in grey-scale.

A less conservative width (which equals twice the width of face rectangle) is used for portrait images, where the human shoulder and upper chest covers most of the bottom edge of image frame. An image is considered a portrait when there is only one detected face whose width is greater than a fourth of image width.

Figure 13:
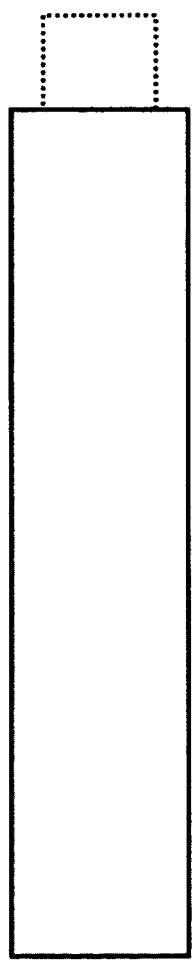
FIG. 13 is an illustrative example of a conservative template for a body map used by an extract rough body map algorithm.

FIG. 13 is an illustrative example of a conservative template for body map used in step 108 of FIG. 1. This is a rectangle immediately below the face rectangle. In some preferred embodiments, the width is equal to 1.5 or 2 times the width of face rectangle, while the height is equal to nine times the height of the face rectangle. In some embodiments, the width is equal to a single value between 1.3 and 2.5 times the width of face rectangle, while the height is equal to a single value between five times and twelve times the height of the face rectangle. The face rectangle (shown in dotted lines) is not part of this template. In some embodiments, twice the width is used for portraits. This template is conservative for width and liberal for height.

Figure 15:
FIG. 15 illustrates the rough person mask for the example used in FIG. 5(*a*).

Referring to FIG. 1, the method continues in step 109 in which a rough person/people map is extracted. The rough person/people map 109 is obtained by the union of skin, face, spine/torso and body maps. This essentially effectuates putting different pieces of the body together in order to get a rough estimate of the entire body, thus far. FIG. 15 shows the rough person mask for the example used in 5(*a*).

Figure 16:
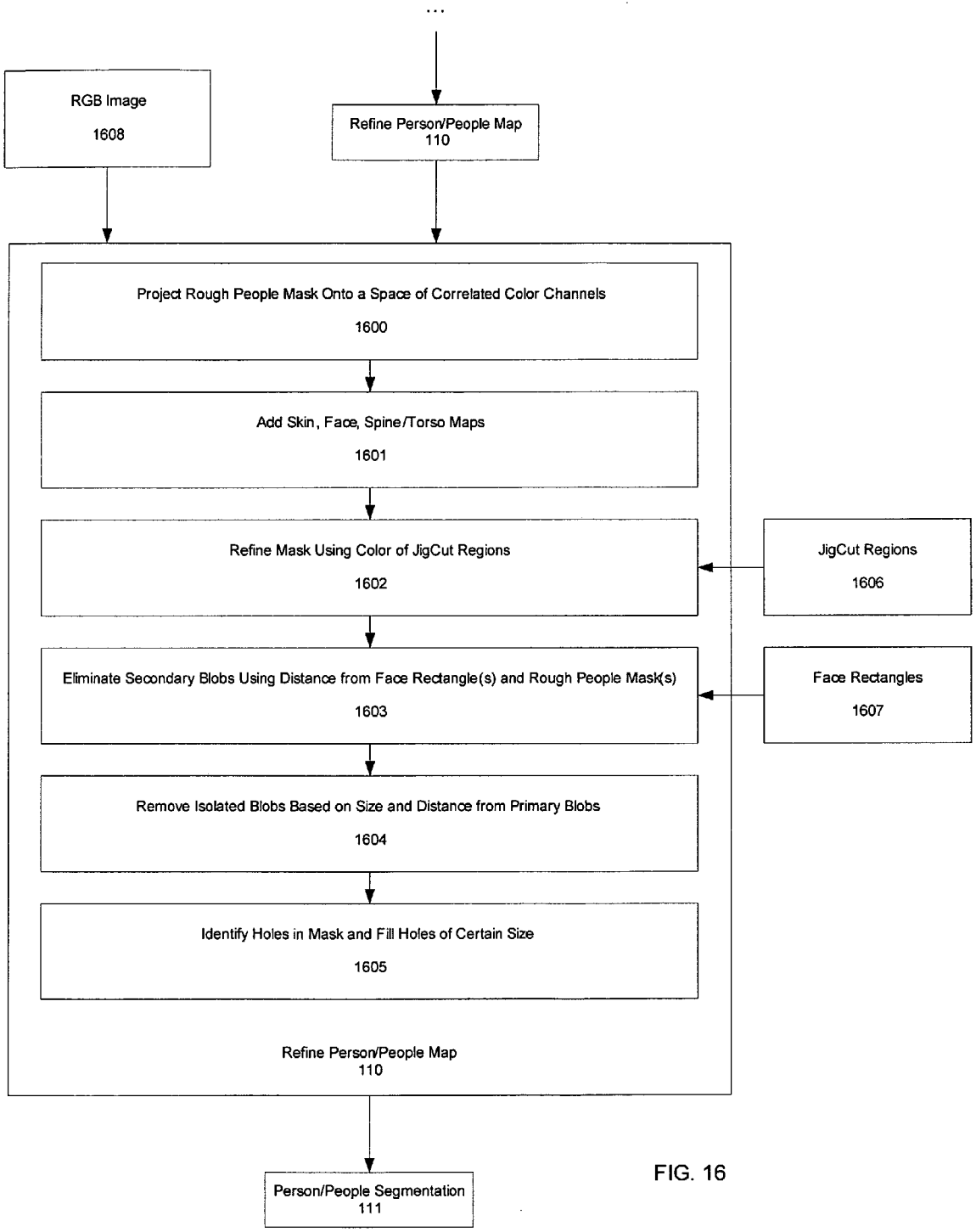
FIG. 16 is a diagrammatic illustration of an exemplary refinement of the rough person/people map step.

The present embodiment would then refine the rough person/people map 110. The rough people mask may have body parts missing and include portions of background. The refinement scheme performed by 110 attempts to tackle this problem through a series of steps. FIG. 16 is a diagrammatic illustration of an exemplary refinement of the rough person/people map 110.

In project rough people mask onto a space of correlated color channels 1600, RGB color channels are decomposed into a set of fuzzy color membership channels. One embodiment utilizes twelve fixed color prototypes and assigns membership to each prototype using fuzzy membership rules, although other numbers of fixed color prototypes are contemplated and within the scope of the methods and systems disclosed herein. These color prototypes are red, green, blue, yellow, orange, purple, brown, pink, light blue, white, black and grey. This is treated as a 12-dimensional color space. The mask is assumed to be represented as a linear combination of membership values (e.g.) linear combination of feature vectors, where each vector corresponds to a pixel in the 12-dimensional prototypical color space. Geometrically, the mask is represented by a slice through the 12-dimensional space, where the pixels are either on or in the vicinity of this slice/hyper-plane. There may be some outliers as well. The goal is to find this plane. Mathematically, the slice is represented by a collection of points that are weighted sum of features. The goal reduces down to determination of these weights. These weights can be estimated using the classical Least-Squares approach. The Least-Square approach has the geometrical interpretation of projection of the set of points onto a plane in the given space. The details of this algorithm in accordance to one embodiment are as follows:

---

Let n = # color channels, m =# pixels,
i = channel index, j = pixel index,
$x_{ij}$ = pixels from channel i,
$y_j$ = pixels from mask.

We want each pixel j to satisfy: $\sum_{i=1}^{n} w_i x_{ij} = y_j$, which can be rewritten as:

$\sum_{i=1}^{n} w_i x_i = y$, where $x_i = [x_{i1}, x_{i2}, \ldots x_{im}]$, $\Rightarrow Aw = y$, where $A = [x_1, x_2, \ldots, x_n]$ $\Rightarrow w_{LS} = (A^T A)^{-1} A^T y = A^+ y$, where $A^+$= Moore-Penrose inverse of A.
Applying this to both rough people mask and it's complement,
$w_{people} = A^+ y$
$w_{notpeople} = A^+ (1 - y)$.
The projected masks can be obtained using these weights as follows:

$y_{people} = ]\sum_{i=1}^{n} (w_{people})_i x_i [$, where]x[ = x normalized to occupy full range[0,1]

$y_{notpeople} = ]\sum_{i=1}^{n} (w_{notpeople})_i x_i [$

These can be treated as 2 independent estimates and an equal mix is given by:
$y_{people}^{Mixture} = ]y_{people} + (1 - y_{notpeople})[$
This mixture is then thresholded to get a binary people mask.
$y_{people}^{Final} = y_{people}^{Mixture} > \min(0.5, \text{Otsu}(y_{people}^{Mixture}))$ where Otsu(·) = threshold based on Otsu's method ("A Thresholding Selection Method From Gray-Level Histogram", N. Otsu, IEEE Transactions on System, Man and Cybernetics, vol. 1, pp. 62-66, 1979").

Figure 17:
FIG. 17 illustrates the projected rough people mask from the sample image of FIG. 5(*a*) in which 17(*a*) is a binary representation while 17(*b*) is the corresponding grey-scaled representation.
Figure 17:

The projected mask from the sample image 5(*a*) is displayed in FIG. 17.

FIG. 17 is provided as an example of project rough people mask onto a space of correlated color channels 1600 for sample image 5(*a*). FIG. 17(*a*) is a binary representation while FIG. 17(*b*) is the corresponding representation in color.

Figure 18:
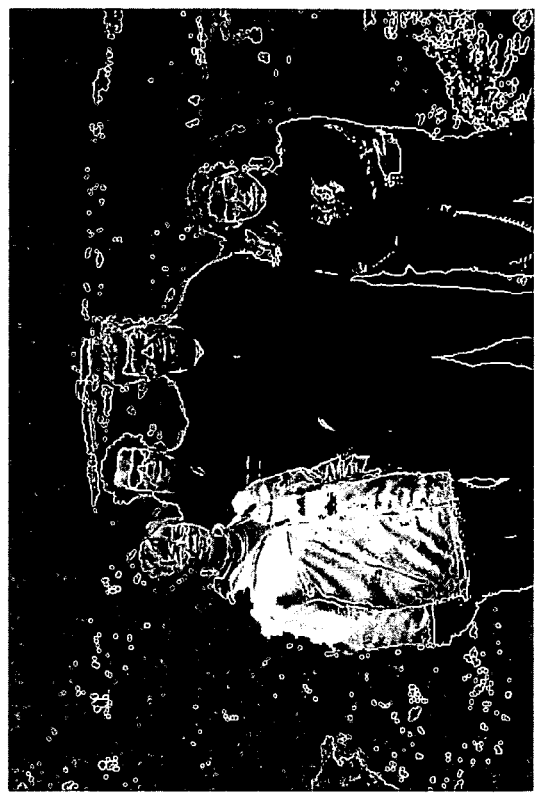
FIG. 18 is an example of an add skin, face, spine/torso maps routine for processing of sample image 5(*a*) in which 18(*a*) is a binary representation of the mask after inclusion and 18(*b*) is the corresponding representation in grey-scale.
Figure 18:

Referring to FIG. 16, in add skin, face, spine/torso maps 1601, the premise is that when there are regions in the background with color similar to skin, such as wooden furniture or sand, it is possible to lose all skin colored pixels after projection. The same applies to torso regions. Skin, face, and spine/torso maps from previous steps can be utilized. These are considered to be high confidence maps since they are more robust than maps for limbs which are harder to estimate for complex human configurations. FIG. 18 provides an example of add skin, face, spine/torso maps 1601 for processing of sample image 5(*a*). FIG. 18(*a*) is a binary representation of the mask after inclusion and FIG. 18(*b*) is the corresponding representation in color.

Referring to FIG. 16, in refine mask using color of JigCut regions 1602, JigCut cleanup is applied to the mask from 1601 so that the mask is a union of JigCut regions. JigCut regions are selected only when they contain at least 50% of pixels from the mask. JigCut regions that were introduced by projection 1600 are examined. An added JigCut region is retained only if its color matches the color of one of the JigCut Regions common to the masks before and after projection. The following is a summarization in a mathematical representation of operations involved in clean up after projection in accordance to one embodiment:

M:=rough binary mask for people
P:=projection operator
A:=set of JigCut regions of M
B:=set of JigCut regions of P(M)
C:=A∩B
D:=B−A
$S(r_i, r_j)$:=1 iff JigCut regions $r_i, r_j$ have similar color, else it is 0.
X:={r∈B−A|∃t∈C,S(r,t)=1}
Y:=mask after clean up=X∪C Color similarity might prove to be difficult to account for since if a JigCut region is introduced, it is partly because the color of that region is very close to the hyper-plane in the 12-dimensional space. Using RGB or CIE-Lab or HSL or any other color space in a standard way (Euclidean or Manhattan distance in 2-D or 3-D color space) should fail.

Figure 19:
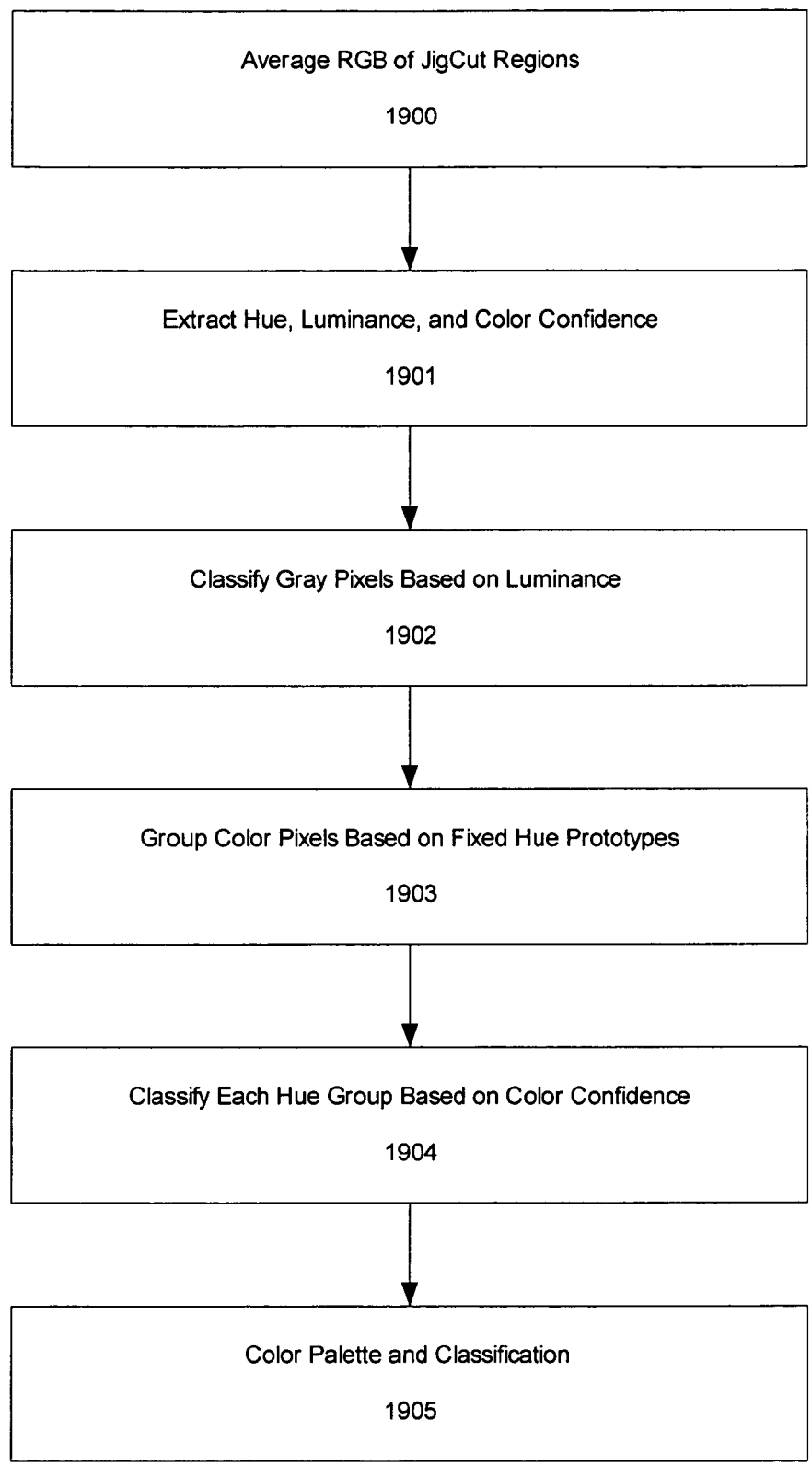
FIG. 19 is a diagrammatic illustration of a method for refining a mask using JigCut regions.
Figure 20:
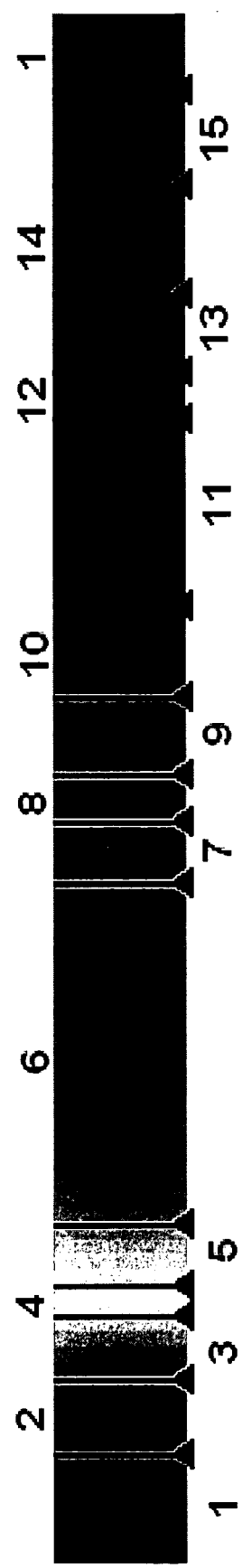
FIG. 20 is an illustration of color regions based on a hue wheel.

A hierarchical rule-based color quantizer is used in some embodiments to identify the colors in the color palette for the selected image. The color quantizer uses hue and luminance from the standard HSL space along with a color confidence map. Color quantization is applied to the average colors of JigCut regions. FIG. 19 is a diagrammatic illustration of one embodiment for refining the mask using JigCut regions. In this embodiment, the average RGB of JigCut regions 1900 is utilized to extract hue, luminance, and color confidence 1901. Step 1901 extracts hue, luminance and assign color confidence based on distance from the line from (0,0,0) to (1,1,1)

in RGB color space. In some embodiments, the distance formula is normalized so that the maximum value is unity. Then, in the present embodiment, gray pixels based on luminance are classified in step 1902. In some embodiments this is accomplished by classifying low color confidence (or "gray") pixels based on luminance. In some embodiments, there are five uniformly spaced luminance bins, although other numbers of uniformly spaced luminance bins or nonuniformly spaced luminance bins are contemplated and within the scope of the disclosed system and methods. In some embodiments, color confidence is assumed to be low when color confidence is 6%. Then the present embodiment groups color pixels based on fixed hue prototypes 1903. Colorful pixels are grouped based on hue as shown in the table below and in FIG. 20. FIG. 20 is provided as an illustration of the color regions based on the hue wheel.

| Hue Bin | Name | Hue Interval |
|---------|------|--------------|
| 1 | Red | [0, 0.0707) ∪ [0.9596, 1] |
| 2 | Orange | [0.0707, 0.1212) |
| 3 | Light Orange | [0.1212, 0.1616) |
| 4 | Yellow | [0.1616, 0.1818) |
| 5 | Yellowish Green | [0.1818, 0.2222) |
| 6 | Green | [0.2222, 0.4444) |
| 7 | Greenish Blue | [0.4444, 0.4848) |
| 8 | Cyan | [0.4848, 0.5152) |
| 9 | Dark Cyan | [0.5152, 0.5657) |
| 10 | Light Blue | [0.5657, 0.6263) |
| 11 | Blue | [0.6263, 0.7475) |
| 12 | Pinkish Blue | [0.7475, 0.7778) |
| 13 | Bluish Pink | [0.7778, 0.8283) |
| 14 | Pink | [0.8283, 0.8990) |
| 15 | Pinkish Red | [0.8990, 0.9596) |

Figure 21:
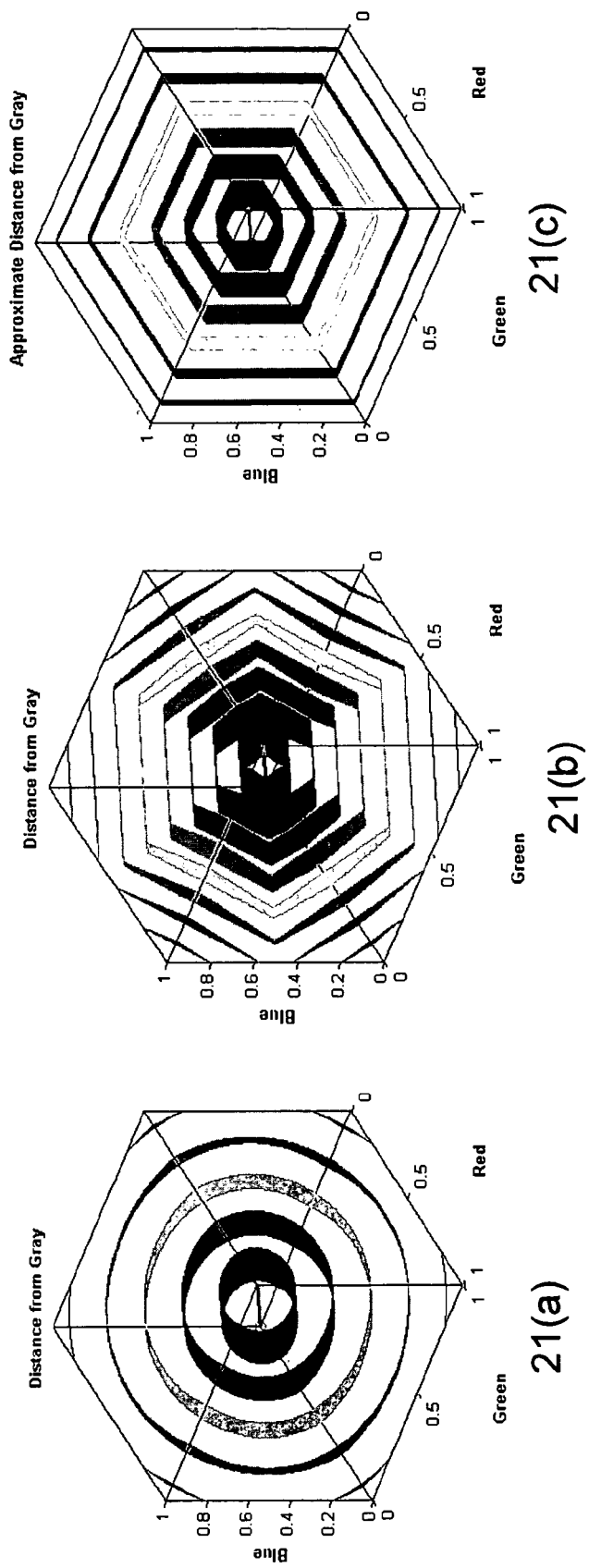
FIG. 21 illustrates an RGB-color cube.

FIG. 21 illustrates the RGB-color cube. The line connecting (0,0,0) and (1,1,1) is shown in pink. FIGS. 21(*a*), 21(*b*), and 21(*c*) show the distance contour from this diagonal line for various metrics. These contours are shown in different colors (blue, cyan, green, yellow, orange, red). Points that lie on the line connecting (0,0,0) and (1,1,1) in RGB color space are defined to be pure gray. Distance from this line is used as a confidence of color. 21(*a*) is Euclidean distance (2-norm) to the diagonal line $d_a = \sqrt{(r-t)^2 + (g-t)^2 + (b-t)^2}$, where $t=(r+g+b)/3$ (b) 1-norm $d_b = |r-t| + |g-t| + |b-t|$ 21(*c*) approximation that resembles 1-norm $d_{approx} = d_c = |r-g| + |g-b| + |b-r|$. The present embodiment utilizes option 21(*c*) due to its simplicity. Using fixed color prototypes is important since this is a non-statistical map and hence does not have bias based on number of sample of similar color.

Then the present embodiment will classify each hue based on color confidence 1904. Each hue bin is further subdivided based on color confidence. In some embodiments, there are five uniformly spaced color-confidence bins, although the disclosed systems and methods contemplates variants in which any number of uniformly spaced or nonuniformly spaced color-confidence bins are used.

Figure 22:
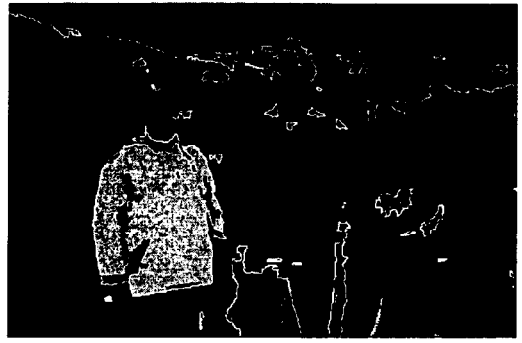
FIG. 22 illustrates the steps taken in classifying each hue group based on color confidence in which 22(*a*) represents labeled regions based on the color in a palette; 22(*b*) represents the common regions before and after projection; 22(*c*) represents regions added by a projection operation; 22(*d*) represents regions removed by a projection operation; 22(*e*) represents the mask after clean up of the projected mask; and 22(*f*) represents the corresponding regions in 22(*e*) in grey-scale.
Figure 22:
Figure 22:
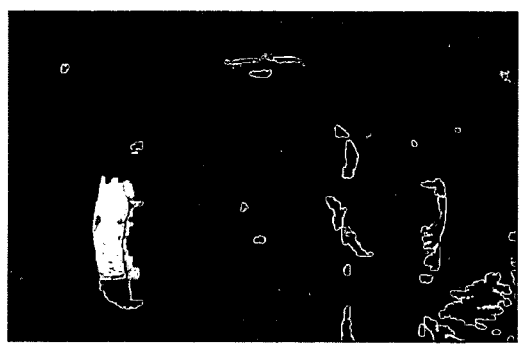
Figure 22:
Figure 22:
Figure 22:

JigCut regions are considered to have the same color if they are quantized to the same color bin. It is unique to method for assigning color similarity. It is also computationally efficient since the present invention avoids calculating distance between every possible pairs of colors. FIG. 22 is provided as an illustration for 1904. It is based off of the original sample image found in 5(*a*). FIG. 22(*a*) represents labeled regions based on the color in the palette. FIG. 22(*b*) represents the common regions before and after projection. FIG. 22(*c*) represents regions added by the projection operation. FIG. 22(*d*) represents regions removed by the projection operation. FIG. 22(*e*) represents the mask after clean up of projected mask. FIG. 22(*e*) represents the mask after clean up of projected mask. FIG. 22(*f*) represents the corresponding regions in FIG. 22(*e*) in color. When complete, color palette and classification will have been reached 1905.

Figure 23:
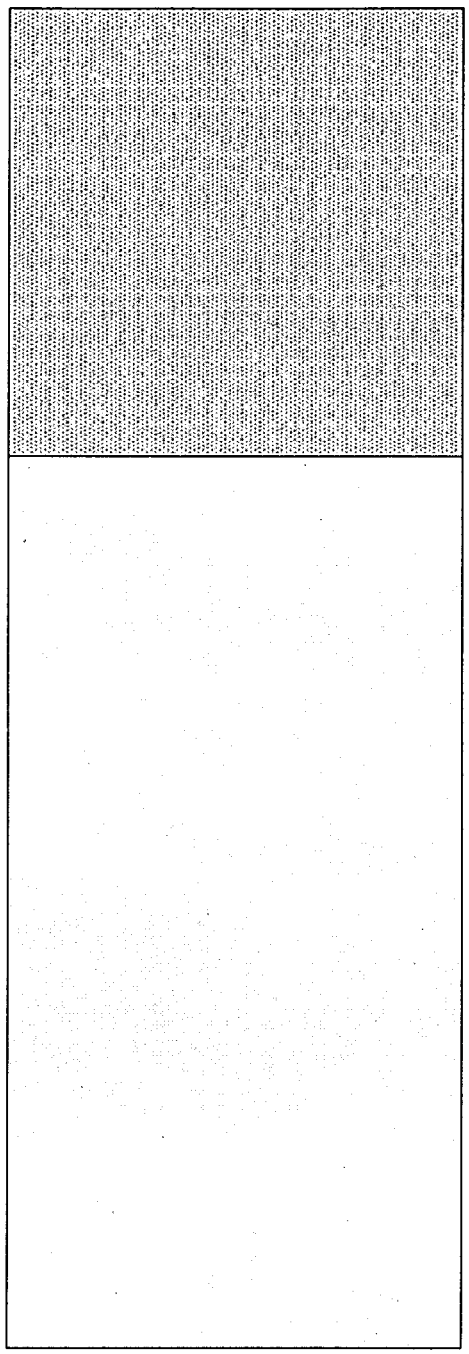
FIG. 23 is an illustrative example of a conservative template for a face-torso template.
Figure 24:
FIG. 24 illustrates the processing of the original image from FIG. 5(*a*) to eliminate secondary blobs using distance from face rectangle(s) and rough people mask(s): 24(*a*) is the binary representation while 24(*b*) is the corresponding grey-scale representation.
Figure 24:

Referring to FIG. 1, in the present embodiment for refine person/people map 110, secondary blobs are eliminated base upon the distance from face rectangle(s) and rough people mask(s) 1603. The binary person mask at this stage may have more connected regions (blobs) than the number of people in the image. Also, it has a potential to have isolated blobs away from the main subjects (people). The present embodiment identifies primary blobs and eliminates secondary blobs that are too far away from all of the primary blobs. Primary blobs are identified by looking at the overlap of blobs with a face-torso map created by the intersection of the mask represented in FIG. 23. FIG. 23 is an illustrative example of a conservative template for the face-torso template. It is created by the union of the face rectangle and a rectangle immediately below it. The total height is three times the height of the face rectangle. In some embodiments, secondary blobs that are more than ten percent of the smallest dimension of the image away from all of the primary blobs are eliminated. In some embodiments, secondary blobs that are more than two percent, more than five percent, more than fifteen percent, more than twenty percent, or more than thirty percent of the smallest dimension of the image away from all of the primary blobs are eliminated. The effectiveness of this approach is evident in FIG. 24. In FIG. 24, the original image in FIG. 5(*a*) has been processed to eliminate secondary blobs using distance from face rectangle(s) and rough people mask(s). FIG. 24(*a*) is the binary representation while FIG. 24(*b*) is the corresponding color representation.

Figure 25:
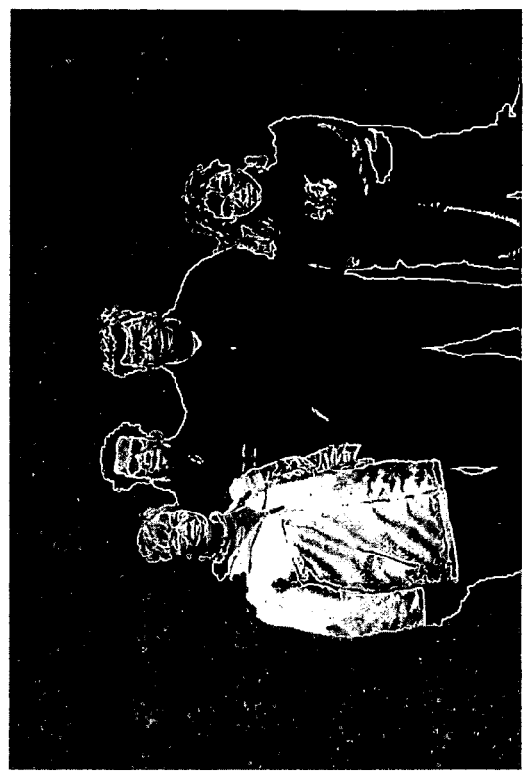
FIG. 25 illustrates the results of a blob removal routine in which the extraneous blob in binary from FIG. 24(*a*) is removed: 25(*b*) corresponds to 25(*a*) in grey-scale.
Figure 25:

In the present embodiment for refine person/people map 110, isolated blobs are removed based on size and distance from primary blobs 1604. In 1604, connected components are identified from the binary mask. In some embodiments, pixels that do not touch at least four other pixels are eliminated. This removes any stray pixels and serious roughness. The area of each of the remaining blobs is measured and Otsu's method ("A thresholding selection method from gray-level histogram", N. Otsu, IEEE Transactions on System, Man and Cybernetics, vol. 1, pp. 62-66, 1979) is used to threshold blob area in this embodiment. Blobs with area exceeding Otsu's threshold are considered primary blobs and are retained. Other blobs are eliminated. In some embodiments, pixels from the original mask that are within two pixels from primary blob are included. In some embodiments, pixels from the original mask that are within three pixels from primary blob are included. In some embodiments, pixels from the original mask that are within four pixels from primary blob are included. In some embodiments, pixels from the original mask that are within one pixel from primary blob are included. In some embodiments, pixels from the original mask that are within five pixels from primary blob are included. FIG. 25 is provided to illustrate 1604. 25(*a*) shows the extraneous blob in binary from 24(*a*) is removed by 1604. 25(*b*) corresponds to 25(*a*) in color.

Figure 26:
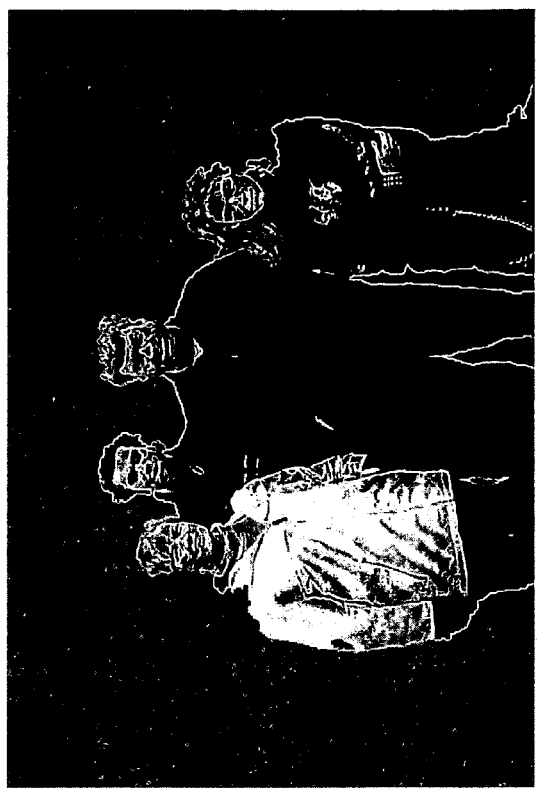
FIG. 26 illustrates the results of a hole identification and fill routine in which FIG. 26(*a*) displays the certain holes in FIG. 25(*a*) filed based on the routine, where FIG. 26(*b*) corresponds to FIG. 26(*a*) in grey-scale.
Figure 26:

In the present embodiment for refine person/people map 110, holes in the mask are identified and holes of certain size are filled (see Identify Holes in Mask and Fill Holes of Certain Size step 1605 of FIG. 16). Due to application of thresholds and variation in luminance and saturation of colors there is a possibility of holes in the mask. These holes are identified and their area is measured. Larger holes are retained and smaller ones are filled. The size and location of face is used to determine the size threshold for each hole. A conservative threshold is half the area of the smallest face. FIG. 26 is provided to illustrate step 1605. FIG. 26(a) displays the certain holes in FIG. 25(a) filed based on 1605. FIG. 26(b) corresponds to FIG. 26(a) in color.

After the person/people map has been refined as illustrated in step 110 of FIG. 1, the goal of having created a segmentation of person/people 111 is achieved.

Figure 29:
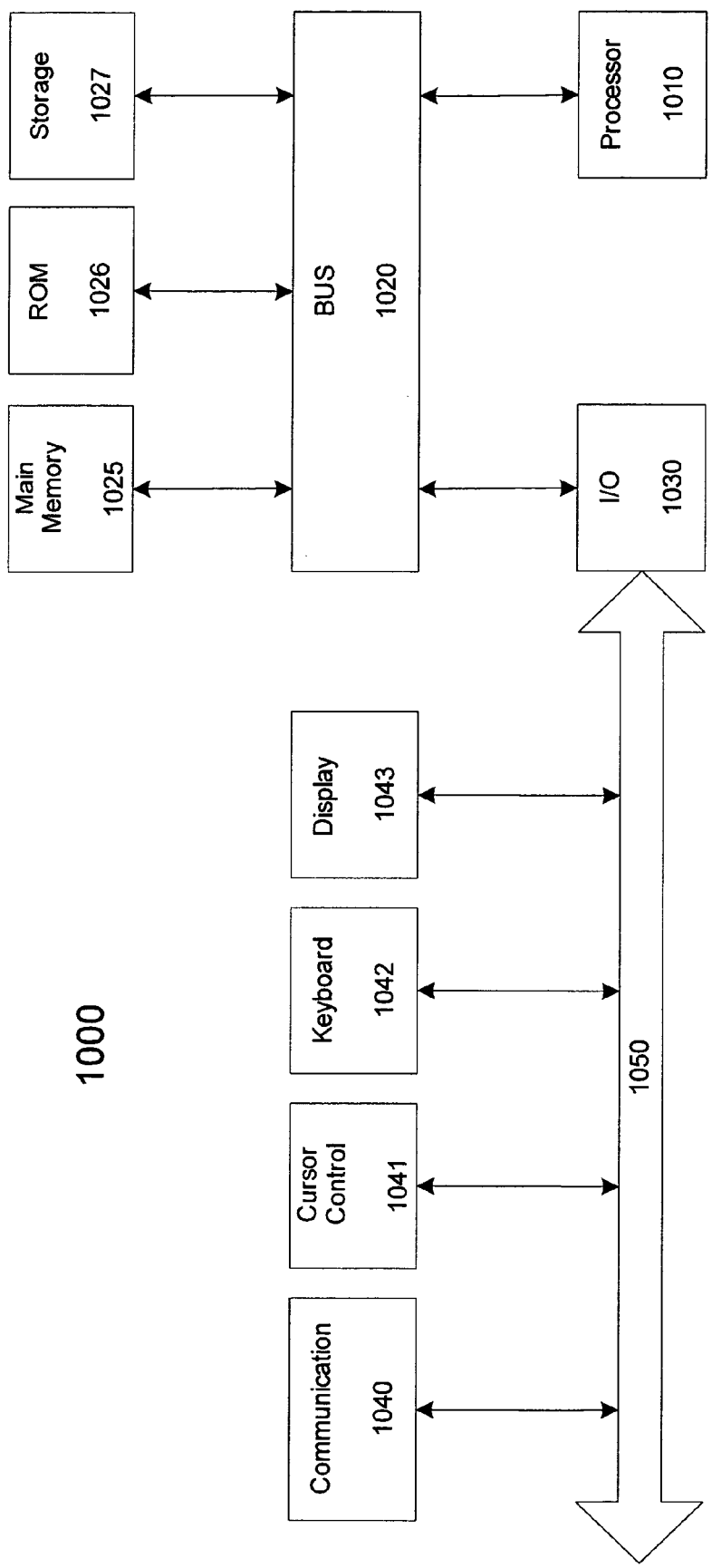
FIG. 29 is a block diagram of an exemplary computer architecture for use with the present system, according to one embodiment of the present invention.

FIG. 29 is an illustration of an exemplary computer architecture for use with the present system, according to one embodiment. Computer architecture 1000 is used to implement the computer systems or image processing systems described in various embodiments of the invention. One embodiment of architecture 1000 comprises a system bus 1020 for communicating information, and a processor 1010 coupled to bus 1020 for processing information. Architecture 1000 further comprises a random access memory (RAM) or other dynamic storage device 1025 (referred to herein as main memory), coupled to bus 1020 for storing information and instructions to be executed by processor 1010. Main memory 1025 is used to store temporary variables or other intermediate information during execution of instructions by processor 1010. Architecture 1000 includes a read only memory (ROM) and/or other static storage device 1026 coupled to bus 1020 for storing static information and instructions used by processor 1010.

A data storage device 1027 such as a magnetic disk or optical disk and its corresponding drive is coupled to computer system 1000 for storing information and instructions. Architecture 1000 is coupled to a second I/O bus 1050 via an I/O interface 1030. A plurality of I/O devices may be coupled to I/O bus 1050, including a display device 1043, an input device (e.g., an alphanumeric input device 1042 and/or a cursor control device 1041).

The communication device 1040 is for accessing other computers (servers or clients) via a network. The communication device 1040 may comprise a modem, a network interface card, a wireless network interface, or other well known interface device, such as those used for coupling to Ethernet, token ring, or other types of networks.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this detailed description, but rather by the claims following.

What is claimed:

1. A method comprising:
    forming a face map of a person in an image, wherein the face map is a face region in the image corresponding to a face of the person;
    forming a torso map of the person in the image based on the face map, wherein the torso map is a torso region in the image corresponding to a torso of the person; and
    forming a person map based on the face map and the torso map, wherein the person map is a person region in the image corresponding to the person, wherein the person map forms a segmented image of the person in the image, and wherein forming the person map includes:
    combining the torso map and the face map to form an initial person map;
    determining whether an additional region in the image includes a color matching a color in the torso map or in the face map; and
    combining the additional region with the initial person map in response to finding a color match.

2. The method of claim 1, wherein forming the face map comprises:
    determining an initial face map for the face of the person, wherein the initial face map is a region in the image that corresponds to a position of the face; and
    determining whether to combine an additional region in the image with the initial face map.

3. The method of claim 1, wherein the face map includes skin pixels.

4. The method of claim 1, wherein determining the torso map comprises:
    determining an initial torso map for the torso of the person, wherein the initial torso map is positioned below the face map; and
    determining whether to combine an additional region in the image with the initial torso map.

5. The method of claim 4, wherein determining whether to combine the additional region with the initial torso map comprises:
    determining whether the additional region and the initial torso map include similar colors.

6. The method of claim 4, wherein determining whether to combine the additional region with the initial torso map comprises:
    determining whether the additional region is adjacent to the initial torso map.

7. The method of claim 1 further comprising:
    determining whether to remove a subset of the torso region within the torso map.

8. The method of claim 7, wherein determining whether to remove the subset of the torso region comprises:
    determining whether a position of the subset of the torso region is at a top edge of the image.

9. The method of claim 7, wherein determining whether to remove the subset of the torso region comprises:
    determining whether a distance between the subset of the torso region and the face map is greater than a certain threshold.

10. The method of claim 7, wherein determining whether to remove the subset of the torso region comprises:
    determining whether a size of the subset of the torso region with respect to the face map is greater than a certain size.

11. A method comprising:
    forming a face map of a person in an image, wherein the face map is a face region in the image corresponding to a face of the person;
    forming a torso map of the person in the image based on the face map, wherein the torso map is a torso region in the image corresponding to a torso of the person;
    forming a person map based on the face map and the torso map, wherein the person map is a person region in the image corresponding to the person, wherein the person map forms a segmented image of the person in the image; and
    determining whether to remove a subset of the torso region within the torso map, wherein determining whether to remove the subset of the torso region comprises determining whether a distance between the subset of the torso region and the face map is greater than a certain threshold.

12. The method of claim 11, wherein forming the face map comprises:
   determining an initial face map for the face of the person, wherein the initial face map is a region in the image that corresponds to a position of the face; and
   determining whether to combine an additional region in the image with the initial face map.

13. The method of claim 11, wherein determining the torso map comprises:
   determining an initial torso map for the torso of the person, wherein the initial torso map is positioned below the face map; and
   determining whether to combine an additional region in the image with the initial torso map.

14. The method of claim 13, wherein determining whether to combine the additional region with the initial torso map comprises:
   determining whether the additional region and the initial torso map include similar colors.

15. The method of claim 13, wherein determining whether to combine the additional region with the initial torso map comprises:
   determining whether the additional region is adjacent to the initial torso map.

16. A method comprising:
   forming a face map of a person in an image, wherein the face map is a face region in the image corresponding to a face of the person;
   forming a torso map of the person in the image based on the face map, wherein the torso map is a torso region in the image corresponding to a torso of the person;
   forming a person map based on the face map and the torso map, wherein the person map is a person region in the image corresponding to the person, wherein the person map forms a segmented image of the person in the image; and
   determining whether to remove a subset of the torso region within the torso map, wherein determining whether to remove the subset of the torso region comprises determining whether a size of the subset of the torso region with respect to the face map is greater than a certain size.

17. The method of claim 16, wherein forming the face map comprises:
   determining an initial face map for the face of the person, wherein the initial face map is a region in the image that corresponds to a position of the face; and
   determining whether to combine an additional region in the image with the initial face map.

18. The method of claim 16, wherein determining the torso map comprises:
   determining an initial torso map for the torso of the person, wherein the initial torso map is positioned below the face map; and
   determining whether to combine an additional region in the image with the initial torso map.

19. The method of claim 18, wherein determining whether to combine the additional region with the initial torso map comprises:
   determining whether the additional region and the initial torso map include similar colors.

20. The method of claim 18, wherein determining whether to combine the additional region with the initial torso map comprises:
   determining whether the additional region is adjacent to the initial torso map.

* * * * *